(12) United States Patent
Sato

(10) Patent No.: US 7,251,081 B2
(45) Date of Patent: Jul. 31, 2007

(54) ZOOM LENS SYSTEM

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 117 days.

(21) Appl. No.: 11/237,668

(22) Filed: Sep. 29, 2005

(65) Prior Publication Data
US 2006/0066954 A1    Mar. 30, 2006

(30) Foreign Application Priority Data
Sep. 30, 2004    (JP) ............................. 2004-288862

(51) Int. Cl.
*G02B 15/14*    (2006.01)
(52) U.S. Cl. ...................... 359/676; 359/687
(58) Field of Classification Search ................ 359/676, 359/686, 687, 683
See application file for complete search history.

(56) References Cited
U.S. PATENT DOCUMENTS

| | | | |
|---|---|---|---|
| 5,583,701 A | 12/1996 | Yamanashi | 359/695 |
| 5,610,766 A * | 3/1997 | Aoki et al. | 359/683 |
| 5,668,666 A * | 9/1997 | Suzuki | 359/674 |
| 6,721,105 B2 | 4/2004 | Ohtake et al. | 359/676 |

FOREIGN PATENT DOCUMENTS

| | | |
|---|---|---|
| JP | 6-281862 A | 10/1994 |
| JP | 2003-177318 A | 6/2003 |

* cited by examiner

*Primary Examiner*—Scott J. Sugarman
*Assistant Examiner*—M. Hasan
(74) *Attorney, Agent, or Firm*—Miles & Stockbridge PC

(57) ABSTRACT

Providing a zoom lens system having a high zoom ratio, a small diameter of the first lens group, capable of being effectively retracted upon retracting the lens barrel. The system includes, in order from an object, a first lens group having positive refractive power, a second lens group having negative refractive power, a third lens group having positive refractive power, a fourth lens group having positive refractive power, and a fifth lens group having positive refractive power. When zooming from a wide-angle end state to a telephoto end state, the first, second, third, and fourth lens groups move along an optical axis and the second lens group moves along a zoom trajectory being concave to the object. The fourth lens group is composed of a front lens group having positive power and a rear lens group having negative power with a space in between. Given conditional expressions are satisfied.

17 Claims, 15 Drawing Sheets

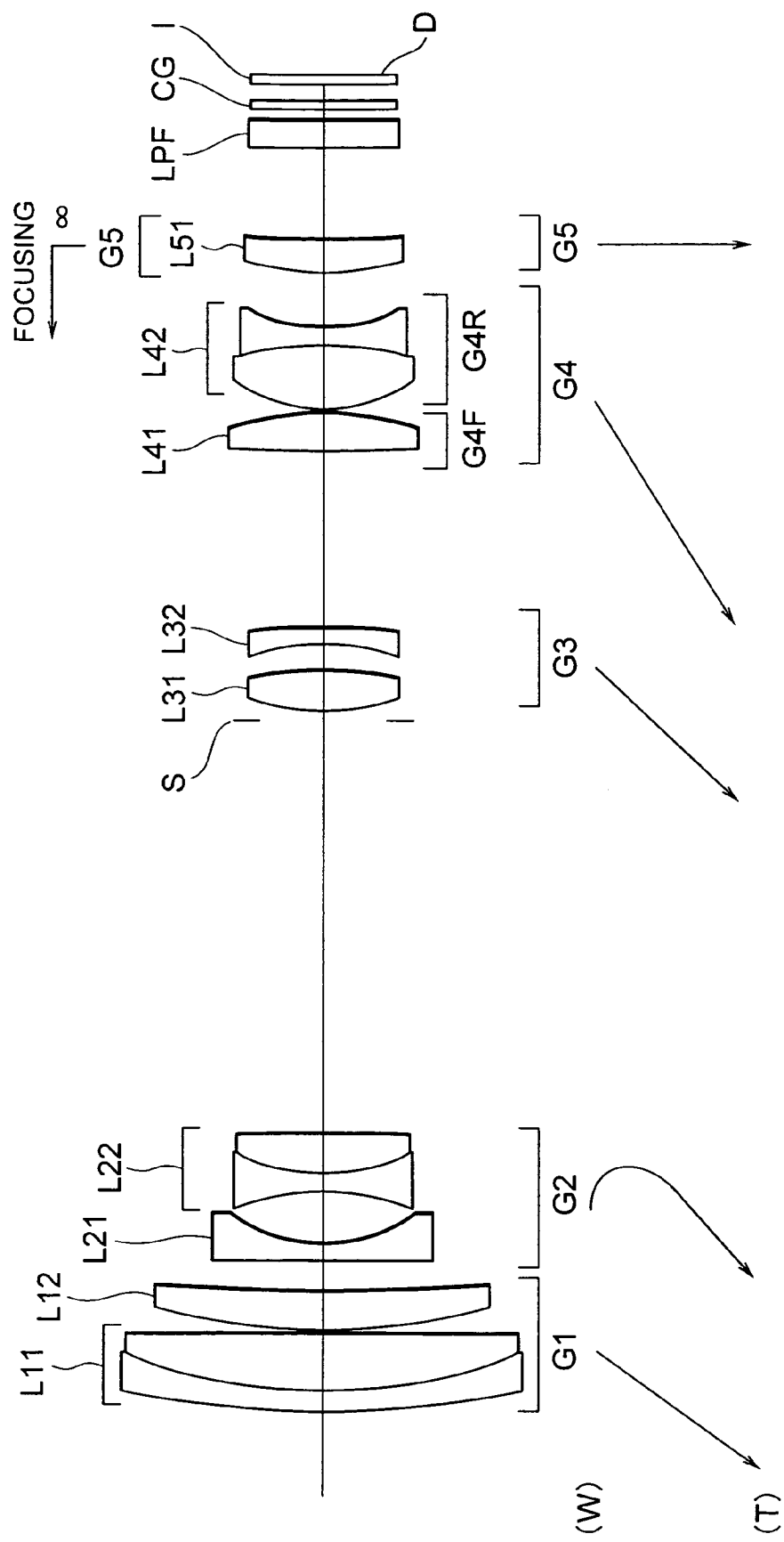

FIG.9A
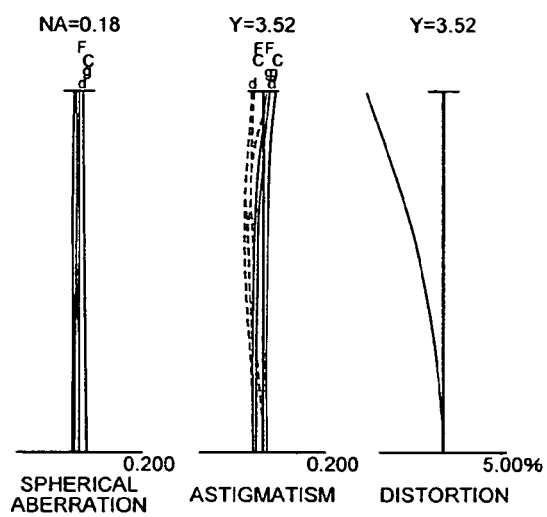
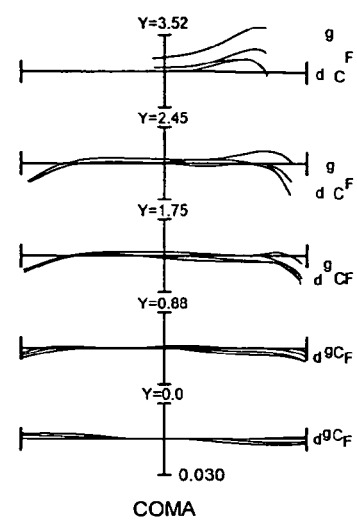
FIG.9B
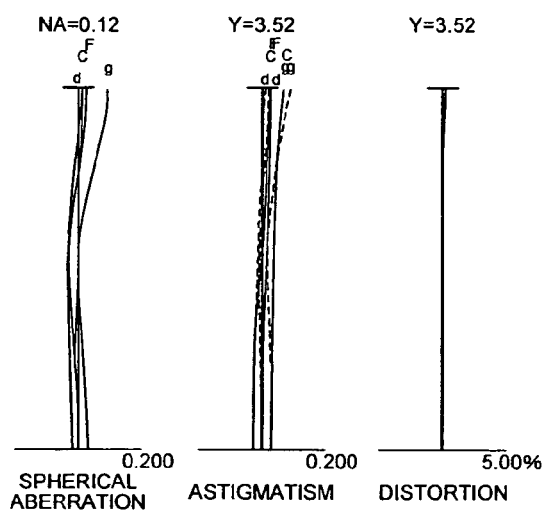
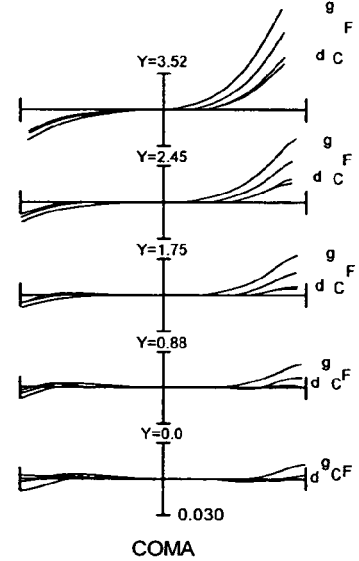
FIG.9C
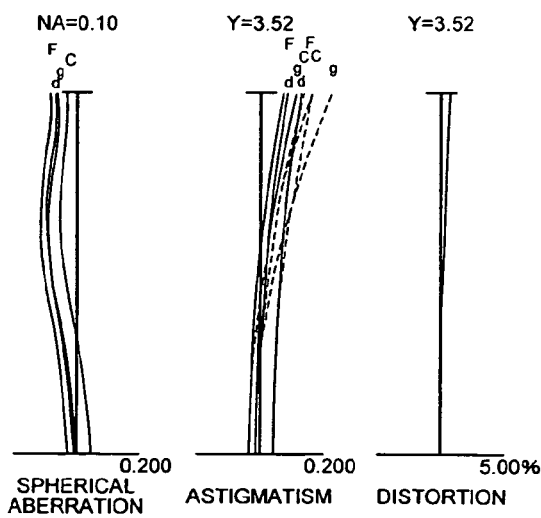
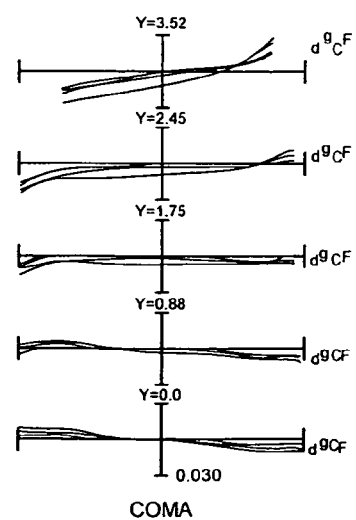

ZOOM LENS SYSTEM

The disclosure of the following priority application is herein incorporated by reference:

Japanese Patent Application No. 2004-288862 filed on Sep. 30, 2004.

BACKGROUND OF THE INVENTION

1. Field of the Invention

The present invention relates to a zoom lens system suitable for an electronic still camera.

2. Related Background Art

In a zoom lens system suitable for an electronic still camera, a zoom lens system whose first lens group is fixed, or a zoom lens system whose first lens group is movable has been known in Japanese Patent Application Laid-Open Nos. 6-281862 and 2003-177318.

However, in a zoom lens system whose first lens group is fixed, although the lens diameter of the first lens group can be small for focusing, it becomes difficult to make a zoom ratio large with securing high optical performance, so that the zoom ratio is about 5.7. Moreover, although the zoom ratio is tried to be made large abut from 7.6 to 9.7, aberration correction becomes insufficient in return for making the zoom ratio large, so that it becomes problem that optical performance deteriorates.

Moreover, in a zoom lens system whose first lens group is movable disclosed in Japanese Patent Application Laid-Open No. 6-281862, although optical performance is sufficient, the zoom ratio is small about from 1.9 to 3.7 and the half angle of view in the telephoto end state is about from 11.7° to 17.3° that is relatively large.

Furthermore, in a zoom lens system whose zoom ratio is made large by making the first lens group movable disclosed in Japanese Patent Application Laid-Open No. 2003-177318, although the zoom ratio is large about from 7.4 to 7.5 and the half angle of view in the telephoto end state is sufficiently small about from 4.6° to 4.7°, optical performance is not sufficient.

SUMMARY OF THE INVENTION

The present invention is made in view of the aforementioned problems and has an object to provide a zoom lens system having the half angle of view in the telephoto end state of about 4 degrees or less, the zoom ratio of about 10 or more, and a small effective diameter of the first lens group with securing high optical performance.

According to a first aspect of the present invention, a zoom lens system includes, in order from an object, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state to a telephoto end state, the first, second, third, and fourth lens groups move along an optical axis and the second lens group moves along a zoom trajectory having a concave shape facing to the object. The fourth lens group is composed of, in order from the object, a front lens group having positive refractive power, and a rear lens group having negative refractive power with an air space in between. The following conditional expression (1) is satisfied:

$$-0.45 < (f4F + f4R)/f4 < -0.20 \tag{1}$$

where f4 denotes the focal length of the fourth lens group, f4F denotes the focal length of the front lens group, and f4R denotes the focal length of the rear lens group.

In the first aspect of the present invention, the following conditional expression (2) is preferably satisfied:

$$0.090 < (fW \times f1)/(fT \times f3) < 0.170 \tag{2}$$

where fT denotes the focal length of the zoom lens system in the telephoto end state, fW denotes the focal length of the zoom lens system in the wide-angle end state, f1 denotes the focal length of the first lens group, and f3 denotes the focal length of the third lens group.

In the first aspect of the present invention, the following conditional expression (3) is preferably satisfied:

$$0.050 < (fW \times f4)/(fT \times f3) < 0.100 \tag{3}$$

where fT denotes the focal length of the zoom lens system in the telephoto end state, fW denotes the focal length of the zoom lens system in the wide-angle end state, and f3 denotes the focal length of the third lens group.

In the first aspect of the present invention, the following conditional expression (4) is preferably satisfied:

$$0.050 < (fW \times f4)/(fT \times f5) < 0.100 \tag{4}$$

where fT denotes the focal length of the zoom lens system in the telephoto end state, fW denotes the focal length of the zoom lens system in the wide-angle end state, and f5 denotes the focal length of the fifth lens group.

In the first aspect of the present invention, the following conditional expression (5) is preferably satisfied:

$$0.40 < f4F/f5 < 0.60 \tag{5}$$

where f5 denotes the focal length of the fifth lens group.

In the first aspect of the present invention, at least one surface of the fourth lens group is an aspherical surface.

In the first aspect of the present invention, the fifth lens group is preferably fixed upon varying the state of lens group positions from the wide-angle end state to the telephoto end state and moved along the optical axis upon focusing.

In the first aspect of the present invention, the zoom lens system may further include a plane parallel plate and a solid-state imaging device.

According to a second aspect of the present invention, a zoom lens system includes, in order from an object, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state to a telephoto end state, the first, second, third, and fourth lens groups move along an optical axis. The fourth lens group is composed of, in order from the object, a front lens group having positive refractive power, and a rear lens group having negative refractive power with an air space in between. The following conditional expression (1) is satisfied:

$$-0.45 < (f4F + f4R)/f4 < -0.20 \tag{1}$$

where f4 denotes the focal length of the fourth lens group, f4F denotes the focal length of the front lens group, and f4R denotes the focal length of the rear lens group.

Other features and advantages according to the present invention will be readily under stood from the detailed description of the preferred embodiments in conjunction with the accompanying drawings.

BRIEF DESCRIPTION OF THE DRAWINGS

FIG. 1 is a diagram showing a sectional view of a large-aperture-ratio internal focusing telephoto lens according to Example 1 of the present invention.

FIG. 9A is graphs showing various aberrations of the zoom lens system according to Example 3 of the present invention focusing on the closest object in the wide-angle end state.

FIG. 9B is graphs showing various aberrations of the zoom lens system according to Example 3 of the present invention focusing on the closest object in the intermediate focal length state.

FIG. 9C is graphs showing various aberrations of the zoom lens system according to Example 3 of the present invention focusing on the closest object in the telephoto end state.

DESCRIPTION OF THE MOST PREFERRED EMBODIMENTS

Figure 2A:
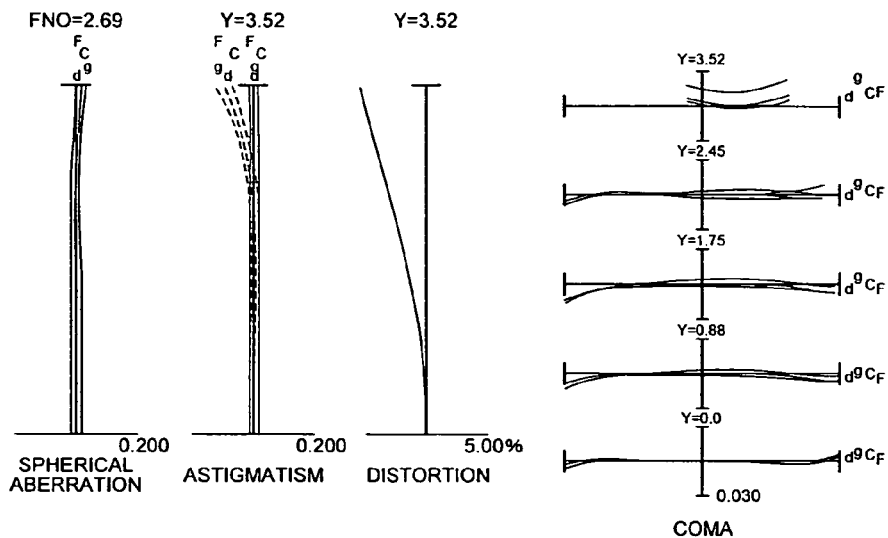
FIG. 2A is graphs showing various aberrations of the zoom lens system according to Example 1 of the present invention focusing on infinity in the wide-angle end state.

A zoom lens system according to each embodiment of the present invention is explained below.

A zoom lens system according to an embodiment of the present invention includes, in order from an object, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state to a telephoto end state, the first lens group, the second lens group, the third lens group, and the fourth lens group move along the optical axis and the second lens group moves along a zoom trajectory having a concave shape facing to the object. The fourth lens group is composed of, in order from the object, a front lens group having positive refractive power, and a rear lens group having negative refractive power with an air space in between. The following conditional expression (1) is satisfied:

$$-0.45 < (f4F + f4R)/f4 < -0.20 \quad (1)$$

where f4 denotes the focal length of the fourth lens group, f4F denotes the focal length of the front lens group, and f4R denotes the focal length of the rear lens group.

Conditional expression (1) is for securing the lens diameter of the first lens group within a given diameter with preferably securing various aberrations in an intermediate focal length state. When the ratio (f4F+f4R)/f4 is equal to or exceeds the upper limit of conditional expression (1), inner coma is produced in the intermediate focal length state, so that it is undesirable. On the other hand, when the ratio (f4F+f4R)/f4 is equal to or falls below the lower limit of conditional expression (1), the effective diameter of the first lens group becomes large, so that it is undesirable. When the upper limit of conditional expression (1) is set to −0.25, inner coma in the intermediate focal length state becomes more preferable. When the lower limit of conditional expression (1) is set to −0.40, the effective diameter of the first lens group becomes more preferable.

In a zoom lens system according to an embodiment of the present invention, the following conditional expression (2) is preferably satisfied:

$$0.090 < (fW \times f1)/(fT \times f3) < 0.170 \quad (2)$$

where fW denotes the focal length of the zoom lens system in the wide-angle end state, fT denotes the focal length of the zoom lens system in the telephoto end state, f1 denotes the focal length of the first lens group, and f3 denotes the focal length of the third lens group.

Conditional expression (2) is for securing preferable optical performance with keeping a moving amount of the first lens group small upon zooming from the wide-angle end state to the telephoto end state. When the ratio (fW×f1)/(fT×f3) is equal to or exceeds the upper limit of conditional expression (2), the moving amount of the first lens group upon zooming becomes large, so it is undesirable. On the other hand, when the ratio (fW×f1)/(fT×f3) is equal to or falls below the lower limit of conditional expression (2), spherical aberration becomes large in negative direction, so it is undesirable. When the upper limit of conditional expression (2) is set to 0.168, the moving amount of the first lens group becomes more preferable. When the lower limit of conditional expression (2) is set to 0.110, spherical aberration becomes more preferable.

In a zoom lens system according to an embodiment of the present invention, the following conditional expression (3) is preferably satisfied:

$$0.050 < (fW \times f4)/(fT \times f3) < 0.100 \quad (3)$$

Conditional expression (3) is for securing preferable optical performance with keeping the effective diameter of the first lens group small. When the ratio (fW×f4)/(fT×f3) is equal to or exceeds the upper limit of conditional expression (3), the effective diameter of the first lens group becomes too large, so it is undesirable. On the other hand, when the ratio (fW×f4)/(fT×f3) is equal to or falls below the lower limit of conditional expression (3), bending of spherical aberration becomes large, so it is undesirable. When the upper limit of conditional expression (3) is set to 0.098, the effective diameter of the first lens group becomes more preferable. When the lower limit of conditional expression (3) is set to 0.060, spherical aberration becomes more preferable.

In a zoom lens system according to an embodiment of the present invention, the following conditional expression (4) is preferably satisfied:

$$0.05 < (fW \times f4)/(fT \times f5) < 0.100 \quad (4)$$

where f5 denotes the focal length of the fifth lens group.

Conditional expression (4) is for securing preferable optical performance with keeping the moving amount of the first lens group small upon zooming. When the ratio (fW×f4)/(fT×f5) is equal to or exceeds the upper limit of conditional expression (4), the moving amount of the first lens group upon zooming becomes large, so it is undesirable. On the other hand, when the ratio (fW×f4)/(fT×f5) is equal to or falls below the lower limit of conditional expression (4), Petzval sum becomes large in negative direction to produce large curvature of field in positive direction, so it is undesirable. When the upper limit of conditional expression (4) is set to 0.097, the moving amount of the first lens group becomes more preferable. When the lower limit of conditional expression (4) is set to 0.062, spherical aberration becomes more preferable.

In a zoom lens system according to an embodiment of the present invention, the following conditional expression (5) is preferably satisfied:

$$0.40 < f4F/f5 < 0.60 \quad (5)$$

Conditional expression (5) is for securing preferable optical performance with keeping the moving amount of the first lens group small upon zooming. When the ratio f4F/f5 is equal to or exceeds the upper limit of conditional expression (5), the moving amount of the first lens group upon zooming becomes large, so it is undesirable. On the other hand, when the ratio f4F/f5 is equal to or falls below the lower limit of conditional expression (5), Petzval sum becomes large in negative direction to produce large curvature of field in positive direction, so it is undesirable. When the upper limit of conditional expression (5) is set to 0.58, the moving amount of the first lens group becomes more preferable. When the lower limit of conditional expression (5) is set to 0.41, uniformity of the image plane becomes more preferable.

In a zoom lens system according to an embodiment of the present invention, in order to obtain preferable spherical aberration in the telephoto end state, it is preferable that at least one lens surface of the fourth lens group is an aspherical surface. Moreover, in order to reduce the number of lens elements, it is preferable that the front lens group of the fourth lens group is constructed by a positive lens element at least one surface of which is an aspherical surface.

In a zoom lens system according to an embodiment of the present invention, in order to simplify a lens barrel for holding the optical system of the zoom lens system or an electric control system, it is preferable that the fifth lens group is fixed upon zooming from the wide-angle end state to the telephoto end state and moved along the optical axis upon focusing. Moreover, in order to reduce burden to a focusing actuator, it is preferable that the fifth lens group is composed of a single positive lens element, so that weight saving of the focusing lens group can be accomplished.

EXAMPLES

Each example of a zoom lens system according to the present invention is explained with reference to accompanying drawings.

In each example, a zoom lens system according to the present invention is composed of, in order from an object, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, an optical low-pass filter LPF, and a cover glass CG of a solid-state imaging device D disposed in the image plane I. The fourth lens group G4 is composed of, in order from the object, a front lens group G4F having positive refractive power and a rear lens group G4R having negative refractive power. When a state of lens group positions varies from a wide-angle end state W to a telephoto end state T, the first lens group G1 moves to the object, the second lens group G2 moves along a zoom trajectory having a concave shape facing to the object, the third lens group G3 moves to the object, and the fourth lens group G4 moves to the object.

Moreover, the fifth lens group G5 is fixed upon zooming from a wide-angle end state W to a telephoto end state T and moves to the object upon focusing from infinity to a close object.

By the way, in each Example, the image height of the solid-state imaging device D disposed in the image plane I is 3.52 mm in Example 1 through 4 and 3.75 mm in Example 5.

Example 1

FIG. 1 is a diagram showing the lens arrangement of a zoom lens system according to Example 1 of the present invention in a wide-angle end state W focusing on infinity.

In FIG. 1, the zoom lens system according to Example 1 is composed of, in order from an object, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, an optical low-pass filter LPF, and a cover glass CG of a solid-state imaging device D disposed in the image plane I.

The first lens group G1 is composed of, in order from the object, a cemented positive lens L11 constructed by a negative meniscus lens having a convex surface facing to the object cemented with a positive meniscus lens having a convex surface facing to the object, and a positive meniscus lens L12 having a convex surface facing to the object.

The second lens group G2 is composed of, in order from the object, a negative meniscus lens L21 having a convex surface facing to the object, and a cemented negative lens L22 constructed by a double concave negative lens cemented with a double convex positive lens.

The third lens group G3 is composed of, in order from the object, a double convex positive lens L31 and a negative meniscus lens L32 having a concave surface facing to the object.

The fourth lens group G4 is composed of, in order from the object, a front lens group G4F and a rear lens group G4R.

The front lens group G4F is composed of a double convex positive lens L41 having an aspherical surface facing to the image.

The rear lens group G4R is composed of a cemented negative lens L42 constructed by, in order from the object, a double convex positive lens cemented with a double concave negative lens.

The fifth lens group G5 is composed of a positive meniscus lens L51 having a convex surface facing to the object.

Various values associated with Example 1 are listed in Table 1. In [Specifications], f denotes the focal length, and FNO denotes the f-number. In [Lens Data], the left most column shows the lens surface number counted in order from the object side, the second column "r" shows a radius of curvature of the lens surface, the third column "d" shows a distance between adjacent lens surfaces, the fourth column "ν" shows Abbe number of the medium at d-line (λ=587.6 nm), the fifth column "n" shows refractive index of the medium at d-line, and "Φ1" denotes the effective diameter of the cemented positive lens L11, "Bf" denotes a back focal length. By the way, refractive index of the air 1.000000 is omitted and a plane is denoted by r=0.0000.

In [Aspherical Data], each aspherical coefficient is shown as the aspherical surface is expressed by the following expression:

$$X(y)=y^2/[r\times\{1+(1-\kappa\times y^2/r^2)^{1/2}\}]+C2\times y^2+C4\times y^4+C6\times y^6+C8\times y^8$$

here $R=1/((1/r)+2\times C2)$ where y denotes a height from the optical axis, X(y) denotes a distance along the optical axis from tangent plane at the vertex of the aspherical surface to the aspherical surface at the height y, r denotes a reference radius of curvature (R denotes a paraxial radius of curvature), κ denotes a conical coefficient, and Ci denote i-th order aspherical coefficient, respectively. In [Aspherical Data], "E–n" denotes "$10^{-n}$". An aspherical surface is denoted by an asterisk (*) attached to the surface number.

In the tables for various values, "mm" is generally used for the unit of length such as the focal length, the radius of curvature, and the distance between optical surfaces. However, since an optical system proportionally enlarged or reduced its dimension can be obtained similar optical performance, the unit is not necessary to be limited to "mm" and any other suitable unit can be used.

The explanation of reference symbols is the same in the other examples, so that duplicated explanations are omitted.

TABLE 1

| [Specifications] | | |
|---|---|---|
| | W | T |
| f = | 6.36 | 60.00 |
| FNO = | 2.6 | 5.4 |

TABLE 1-continued

[Lens Data]

| | r | d | ν | n | |
|---|---|---|---|---|---|
| 1) | 49.9711 | 1.2000 | 23.78 | 1.846660 | Φ1 = 22.0 |
| 2) | 29.4301 | 3.3000 | 55.53 | 1.696797 | |
| 3) | 5378.9855 | 0.1000 | | | |
| 4) | 33.8916 | 2.3000 | 82.56 | 1.497820 | |
| 5) | 117.7111 | (d5) | | | |
| 6) | 411.5528 | 1.0000 | 40.76 | 1.882997 | |
| 7) | 9.1748 | 2.8000 | | | |
| 8) | −14.4058 | 1.0000 | 61.14 | 1.589130 | |
| 9) | 10.8161 | 2.3000 | 22.76 | 1.808095 | |
| 10) | −352.1299 | (d10) | | | |
| 11> | 0.00 | 0.5000 | Aperture Stop S | | |
| 12) | 14.2018 | 2.3000 | 60.67 | 1.563839 | |
| 13) | −19.3736 | 1.4000 | | | |
| 14) | −12.1858 | 1.0000 | 23.78 | 1.846660 | |
| 15) | −32.4283 | (d15) | | | |
| 16) | 103.3476 | 2.2000 | 40.87 | 1.804320 | |
| 17*) | −16.9719 | 0.1000 | | | |
| 18) | 8.5267 | 3.6000 | 82.56 | 1.497820 | |
| 19) | −17.5207 | 1.1000 | 40.76 | 1.882997 | |
| 20) | 9.6921 | (d20) | | | |
| 21) | 14.2621 | 1.9000 | 48.84 | 1.531717 | |
| 22) | 75.3615 | (d22) | | | |
| 23) | 0.0000 | 1.6000 | 70.51 | 1.544370 | |
| 24) | 0.0000 | 0.5000 | | | |
| 25) | 0.0000 | 0.5000 | 64.10 | 1.516800 | |
| 26) | 0.0000 | Bf | | | |

[Aspherical Data]

Surface Number 17

κ = −0.1290
C2 = 0.00000E+00
C4 = 0.00000E+00
C6 = −1.77080E−07
C8 = 1.51460E−09

[Variable Distances]

| | W | M | T |
|---|---|---|---|
| <upon focusing on infinity> | | | |
| f | 6.36000 | 28.00000 | 60.00000 |
| D0 | ∞ | ∞ | ∞ |
| d5 | 1.58729 | 15.69746 | 22.06330 |
| d10 | 22.98517 | 7.63292 | 2.74873 |
| d15 | 9.89944 | 5.01384 | 3.95498 |
| d20 | 2.90783 | 18.06457 | 26.11013 |
| d22 | 5.00000 | 5.00000 | 5.00000 |
| Bf | 1.02477 | 1.02477 | 1.02477 |
| TL | 74.10449 | 83.13355 | 91.60191 |
| <upon focusing on a close object> | | | |
| β | −0.02598 | −0.09576 | −0.05429 |
| D0 | 225.8955 | 216.8664 | 908.3982 |
| d5 | 1.58729 | 15.69746 | 22.06330 |
| d10 | 22.98517 | 7.63292 | 2.74873 |
| d15 | 9.89944 | 5.01384 | 3.95498 |
| d20 | 2.57693 | 13.52669 | 20.75771 |
| d22 | 5.33090 | 9.53788 | 10.35242 |
| Bf | 1.02477 | 1.02477 | 1.02477 |
| TL | 74.10449 | 83.13355 | 91.60191 |

[Values for Conditional Expressions]

(1): (f4F + f4R)/f4 = −0.326
(2): (fW × f1)/(ft × f3) = 0.145
(3): (fW × f4)/(fT × f3) = 0.088
(4): (fW × f4)/(fT × f5) = 0.089
(5): f4F/f5 = 0.558

Figure 2B:
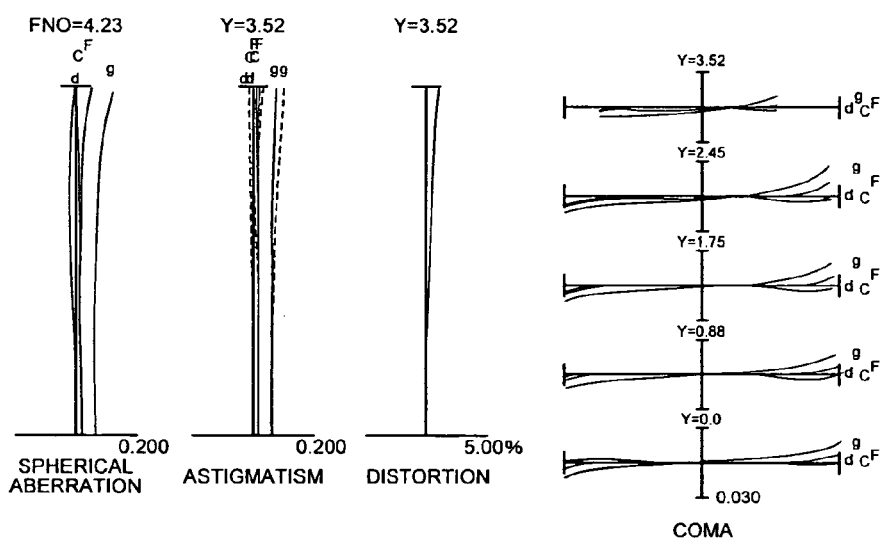
FIG. 2B is graphs showing various aberrations of the zoom lens system according to Example 1 of the present invention focusing on infinity in the intermediate focal length state.
Figure 2C:
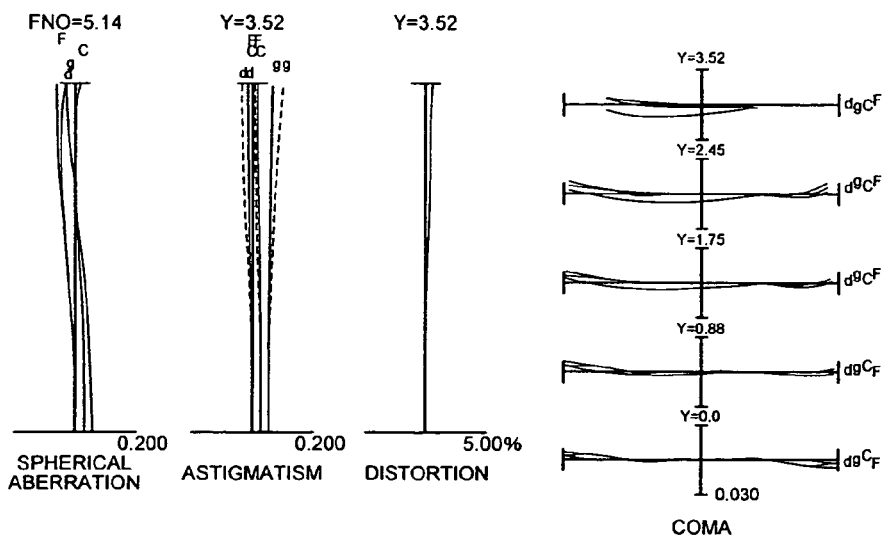
FIG. 2C is graphs showing various aberrations of the zoom lens system according to Example 1 of the present invention focusing on infinity in the telephoto end state.
Figure 3A:
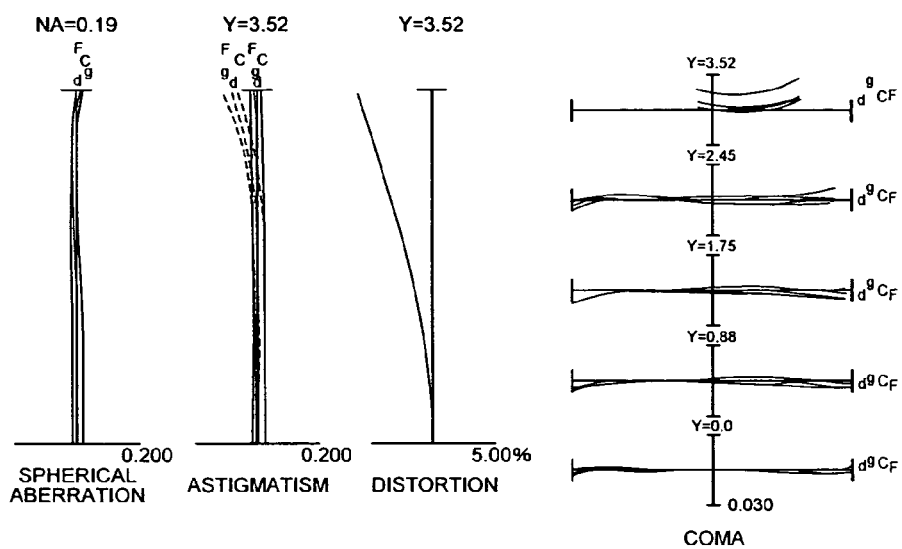
FIG. 3A is graphs showing various aberrations of the zoom lens system according to Example 1 of the present invention focusing on the closest object in the wide-angle end state.
Figure 3B:
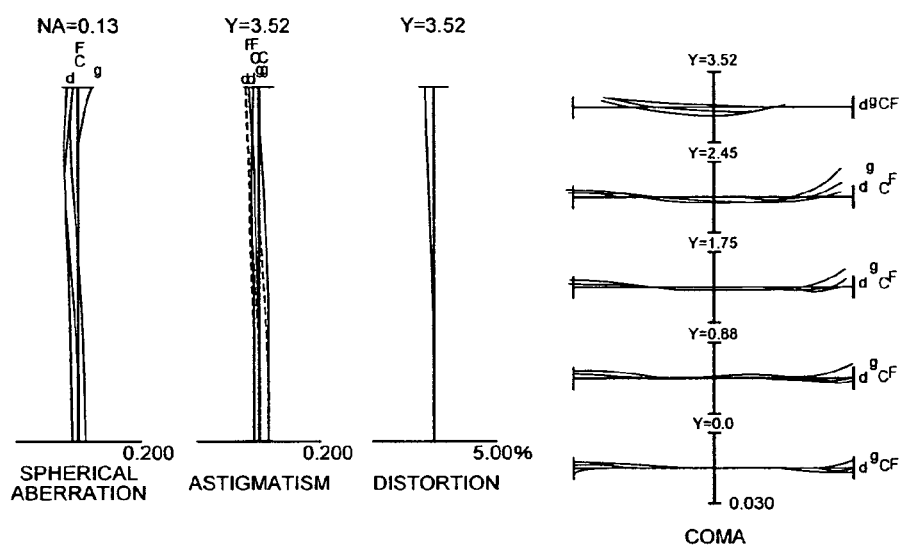
FIG. 3B is graphs showing various aberrations of the zoom lens system according to Example 1 of the present invention focusing on the closest object in the intermediate focal length state.
Figure 3C:
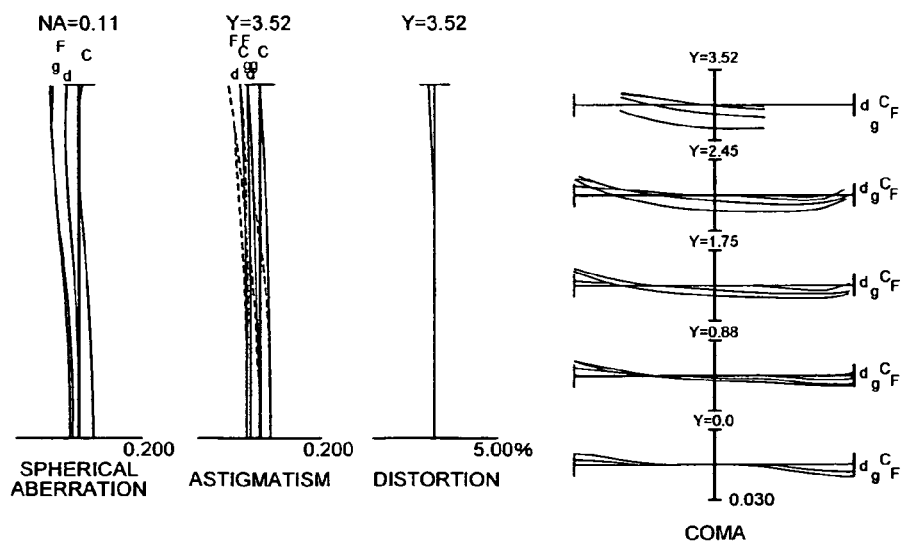
FIG. 3C is graphs showing various aberrations of the zoom lens system according to Example 1 of the present invention focusing on the closest object in the telephoto end state.

FIGS. 2A, 2B, and 2C are graphs showing various aberrations of the zoom lens system according to Example 1 of the present invention focusing on infinity in which FIG. 2A shows various aberrations in the wide-angle end state, FIG. 2B shows various aberrations in the intermediate focal length state, and FIG. 2C shows various aberrations in the telephoto end state. FIGS. 3A, 3B, and 3C are graphs showing various aberrations of the zoom lens system according to Example 1 of the present invention focusing on the closest object in which FIG. 3A shows various aberrations in the wide-angle end state, FIG. 3B shows various aberrations in the intermediate focal length state, and FIG. 3C shows various aberrations in the telephoto end state.

In respective graphs, FNO denotes an f-number, Y denotes an image height, NA denotes a numerical aperture, C denote aberration curve at C-line ($\lambda$=656.3 nm), d denotes aberration curve at d-line (587.6 nm), F denotes aberration curve at F-line ($\lambda$=486.1 nm), and g denotes aberration curve at g-line ($\lambda$=435.8 nm). In the graph showing astigmatism, a solid line indicates a sagittal image plane and a broken line indicates a meridional plane. The above-described explanation regarding various aberration graphs is the same as the other examples.

As is apparent from the respective graphs, the zoom lens system according to Example 1 shows superb optical performance as a result of good corrections to various aberrations in each focal length state from the wide-angle end state to the telephoto end state.

By the way, in Example 1, the effective diameter Φ1 of the cemented positive lens L11 which is the most object side lens of the first lens group G1 is less than 22.0 mm, so that the zoom lens system is a very compact design. The moving amount of the first lens group upon zooming from the wide-angle end state W to the telephoto end state T is about ⅕ of the total lens length of the zoom lens system in the telephoto end state T, so that the lens barrel can be effectively retracted upon retracting. The half angle of view in the telephoto end state T is about 3.3 degrees.

Example 2

Figure 4:
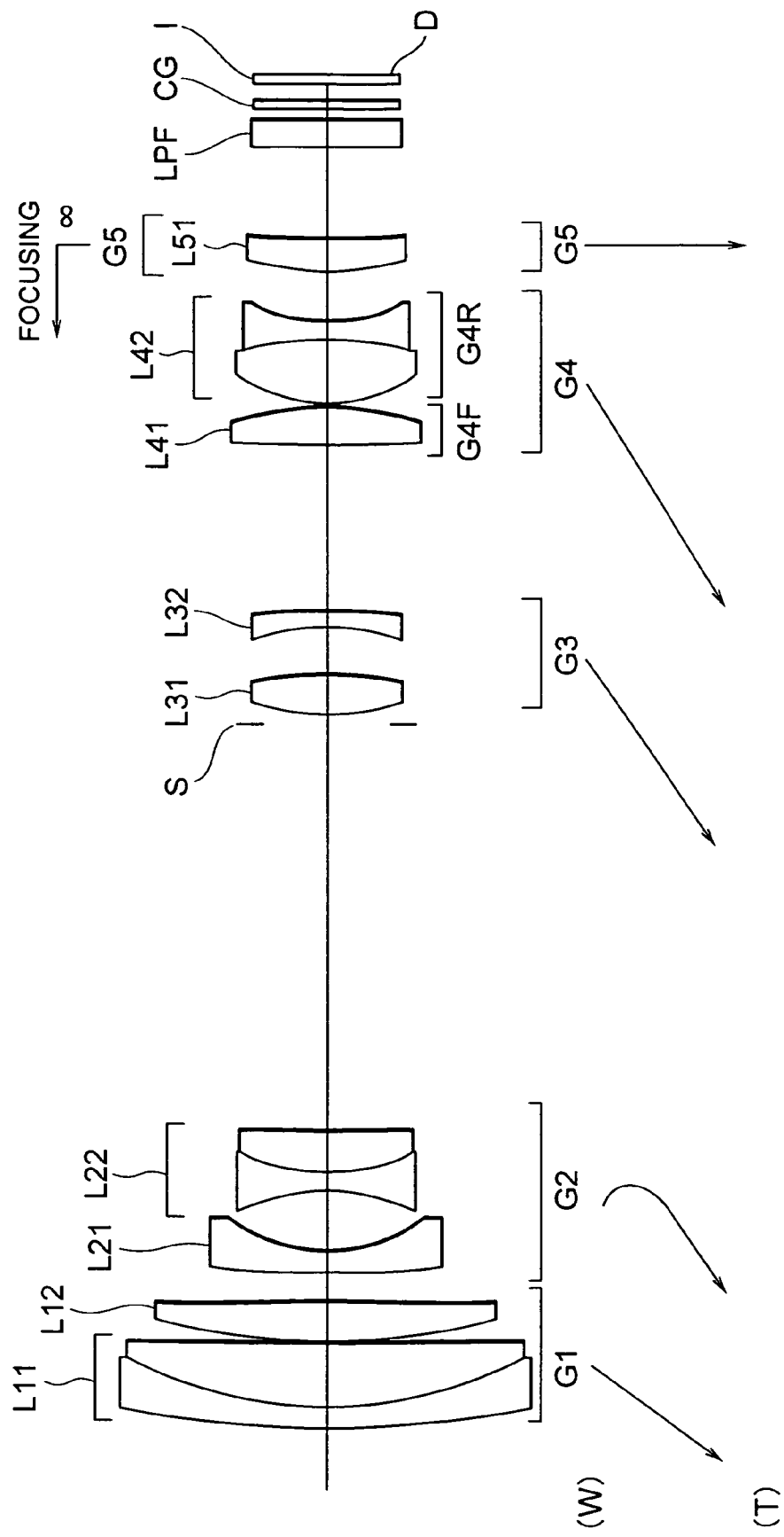
FIG. 4 is a diagram showing a sectional view of a large-aperture-ratio internal focusing telephoto lens according to Example 2 of the present invention.

FIG. 4 is a diagram showing the lens arrangement of a zoom lens system according to Example 2 of the present invention in a wide-angle end state W focusing on infinity.

In FIG. 4, the zoom lens system according to Example 2 is composed of, in order from an object, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, an optical low-pass filter LPF, and a cover glass CG of a solid-state imaging device D disposed in the image plane I.

The first lens group G1 is composed of, in order from the object, a cemented positive lens L11 constructed by a negative meniscus lens having a convex surface facing to the object cemented with a positive meniscus lens having a convex surface facing to the object, and a positive meniscus lens L12 having a convex surface facing to the object.

The second lens group G2 is composed of, in order from the object, a negative meniscus lens L21 having a convex surface facing to the object, and a cemented negative lens L22 constructed by a double concave negative lens cemented with a positive meniscus lens having a convex surface facing to the object.

The third lens group G3 is composed of, in order from the object, a double convex positive lens L31 and a negative meniscus lens L32 having a concave surface facing to the object.

The fourth lens group G4 is composed of, in order from the object, a front lens group G4F and a rear lens group G4R.

The front lens group G4F is composed of a double convex positive lens L41 having an aspherical surface facing to the image.

The rear lens group G4R is composed of a cemented negative lens L42 constructed by, in order from the object, a double convex positive lens cemented with a double concave negative lens.

The fifth lens group G5 is composed of a positive meniscus lens L51 having a convex surface facing to the object.

Various values associated with Example 2 are listed in Table 2.

TABLE 2

[Specifications]

| | W | T |
|---|---|---|
| f = | 6.36 | 60.00 |
| FNO = | 2.7 | 5.9 |

[Lens Data]

| | r | d | ν | n | |
|---|---|---|---|---|---|
| 1) | 55.0652 | 1.2000 | 33.89 | 1.803840 | Φ1 = 22.2 |
| 2) | 23.7762 | 3.6000 | 55.53 | 1.696797 | |
| 3) | 215.8744 | 0.1000 | | | |
| 4) | 36.5812 | 2.3000 | 82.56 | 1.497820 | |
| 5) | 2497.9174 | (d5) | | | |
| 6) | 60.2908 | 1.2000 | 40.76 | 1.882997 | |
| 7) | 8.5204 | 3.3000 | | | |
| 8*) | −12.7297 | 1.1000 | 64.10 | 1.516800 | |
| 9) | 10.7779 | 2.4000 | 22.76 | 1.808095 | |
| 10) | 135.4699 | (d10) | | | |
| 11> | 0.0000 | 0.5000 | Aperture Stop S | | |
| 12) | 14.1390 | 2.3000 | 82.52 | 1.497820 | |
| 13) | −19.3654 | 2.6000 | | | |
| 14) | −10.6233 | 1.1000 | 23.78 | 1.846660 | |
| 15) | −19.0400 | (d15) | | | |
| 16) | 68.4505 | 2.2000 | 40.87 | 1.804320 | |
| 17*) | −18.2949 | 0.1000 | | | |
| 18) | 9.1400 | 3.6000 | 82.56 | 1.497820 | |
| 19) | −19.6293 | 1.1000 | 40.76 | 1.882997 | |
| 20) | 9.7796 | (d20) | | | |
| 21) | 12.6808 | 1.9000 | 8.84 | 1.531717 | |
| 22) | 48.0770 | (d22) | | | |
| 23) | 0.0000 | 1.6000 | 70.51 | 1.544370 | |
| 24) | 0.0000 | 0.5000 | | | |
| 25) | 0.0000 | 0.5000 | 64.10 | 1.516800 | |
| 26) | 0.0000 | Bf | | | |

[Aspherical Data]

Surface Number 8

κ = 1.4722
C2 = 0.00000E+00
C4 = 0.00000E+00
C6 = −1.17080E−06
C8 = 5.18160E−09

Surface Number 17

κ = −0.2417
C2 = 0.00000E+00
C4 = 0.00000E+00
C6 = −8.07840E−08
C8 = 1.57540E−10

[Variable Distances]

| | W | M | T |
|---|---|---|---|

<upon focusing on infinity>

| f | 6.36000 | 28.00000 | 60.00000 |
|---|---|---|---|
| D0 | ∞ | ∞ | ∞ |
| d5 | 1.53220 | 16.37499 | 22.66404 |
| d10 | 22.72841 | 7.26469 | 2.92108 |
| d15 | 9.23659 | 4.47495 | 3.24643 |
| d20 | 2.52172 | 20.12208 | 33.21485 |
| d22 | 5.20000 | 5.20000 | 5.20000 |
| Bf | 0.83352 | 0.83352 | 0.83352 |
| TL | 75.25244 | 87.47022 | 101.27992 |

<upon focusing on a close object>

| β | −0.02607 | −0.09698 | −0.05408 |
|---|---|---|---|
| D0 | 224.7476 | 212.5298 | 898.7201 |
| d5 | 1.53220 | 16.37499 | 22.66404 |
| d10 | 22.72841 | 7.26469 | 2.92108 |
| d15 | 9.23659 | 4.47495 | 3.24643 |
| d20 | 2.20140 | 15.66133 | 28.02150 |
| d22 | 5.52032 | 9.66074 | 10.39335 |
| Bf | 0.83352 | 0.83352 | 0.83352 |
| TL | 75.25244 | 87.47022 | 101.27992 |

[Values for Conditional Expressions]

(1): (f4F + f4R)/f4 = −0.255
(2): (fW × f1)/(ft × f3) = 0.168
(3): (fW × f4)/(fT × f3) = 0.098
(4): (fW × f4)/(fT × f5) = 0.097
(5): f4F/f5 = 0.571

Figure 5A:
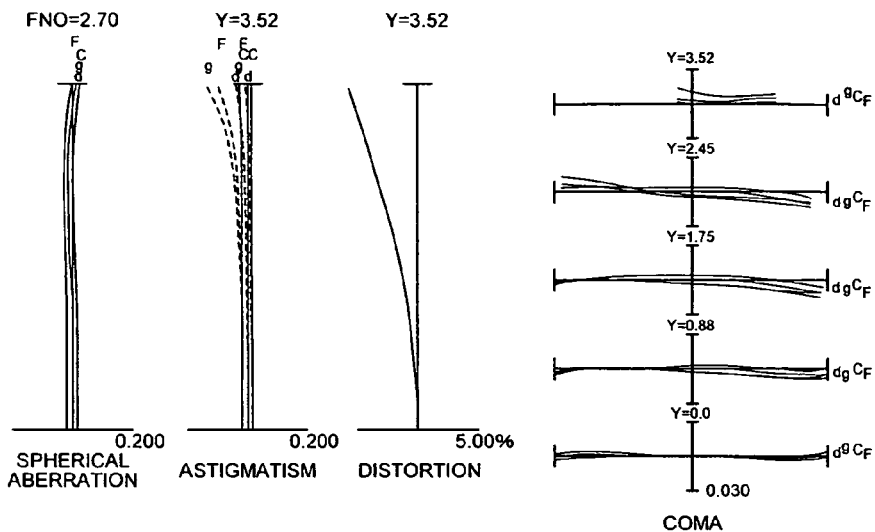
FIG. 5A is graphs showing various aberrations of the zoom lens system according to Example 2 of the present invention focusing on infinity in the wide-angle end state.
Figure 5B:
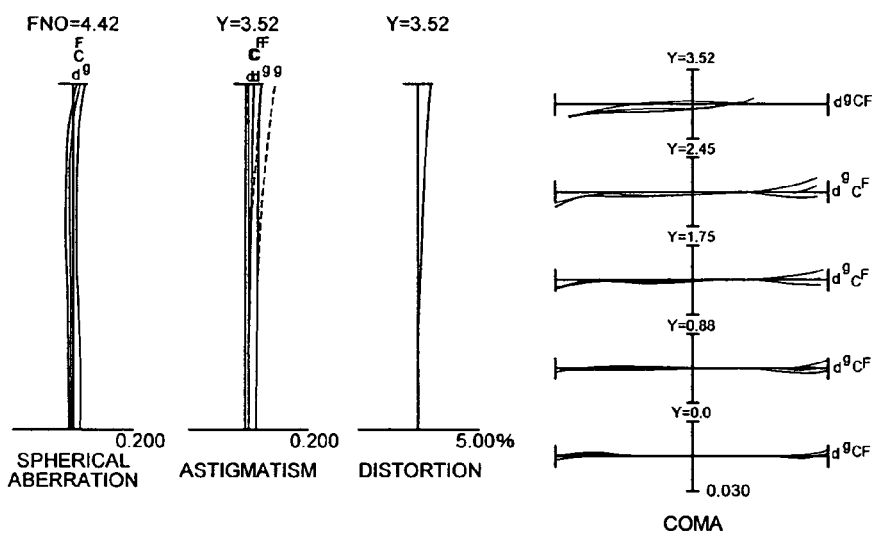
FIG. 5B is graphs showing various aberrations of the zoom lens system according to Example 2 of the present invention focusing on infinity in the intermediate focal length state.
Figure 5C:
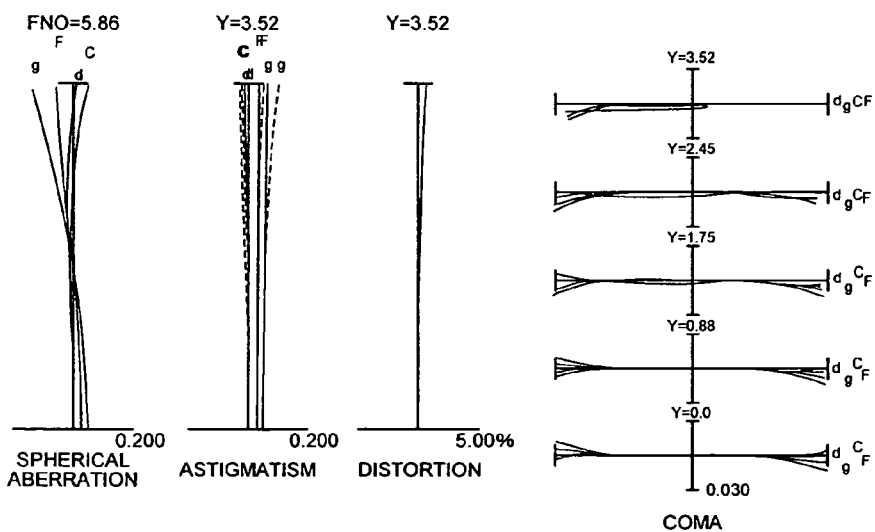
FIG. 5C is graphs showing various aberrations of the zoom lens system according to Example 2 of the present invention focusing on infinity in the telephoto end state.
Figure 6A:
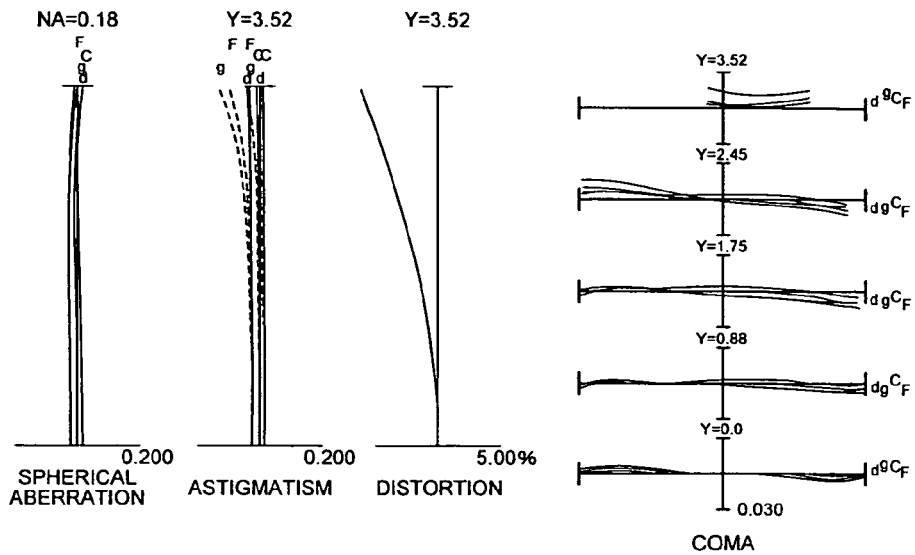
FIG. 6A is graphs showing various aberrations of the zoom lens system according to Example 2 of the present invention focusing on the closest object in the wide-angle end state.
Figure 6B:
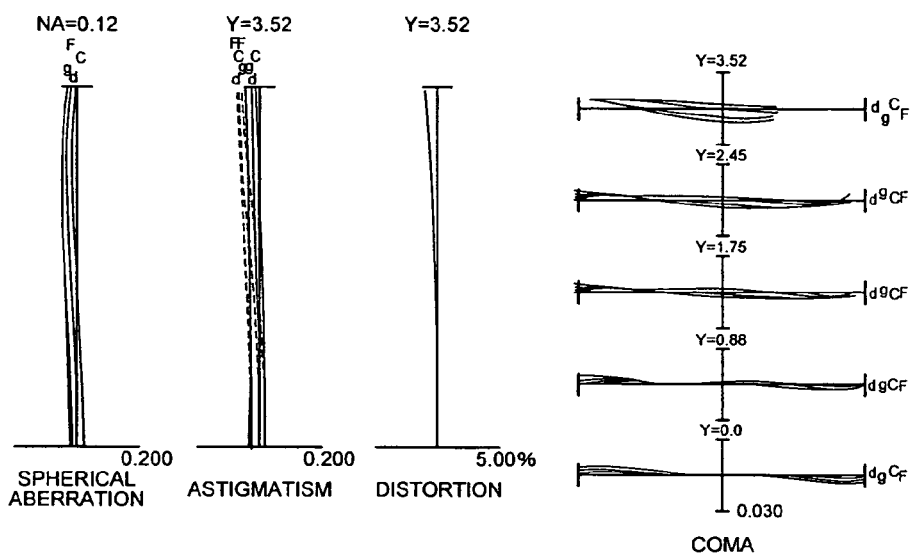
FIG. 6B is graphs showing various aberrations of the zoom lens system according to Example 2 of the present invention focusing on the closest object in the intermediate focal length state.
Figure 6C:
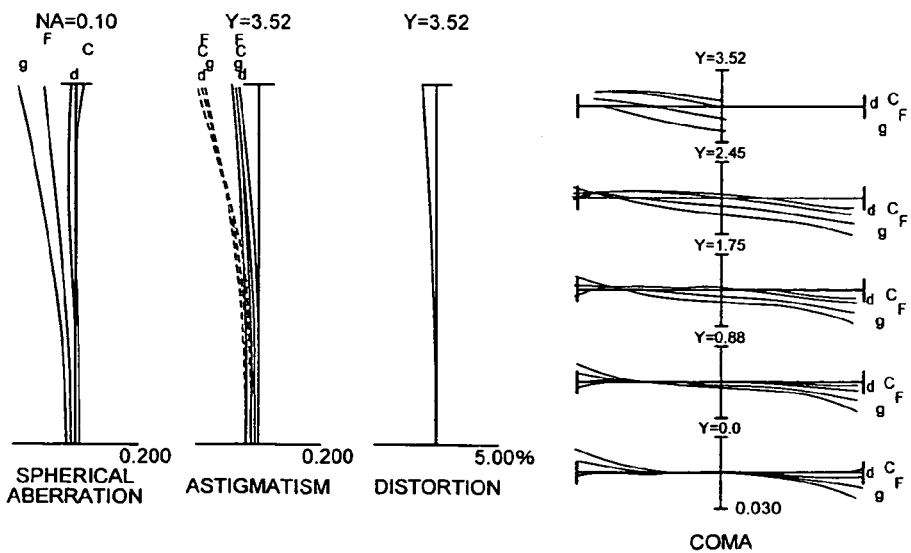
FIG. 6C is graphs showing various aberrations of the zoom lens system according to Example 2 of the present invention focusing on the closest object in the telephoto end state.

FIGS. 5A, 5B, and 5C are graphs showing various aberrations of the zoom lens system according to Example 2 of the present invention focusing on infinity in which FIG. 5A shows various aberrations in the wide-angle end state, FIG. 5B shows various aberrations in the intermediate focal length state, and FIG. 5C shows various aberrations in the telephoto end state. FIGS. 6A, 6B, and 6C are graphs showing various aberrations of the zoom lens system according to Example 2 of the present invention focusing on the closest object in which FIG. 6A shows various aberrations in the wide-angle end state, FIG. 6B shows various aberrations in the intermediate focal length state, and FIG. 6C shows various aberrations in the telephoto end state.

As is apparent from the respective graphs, the zoom lens system according to Example 2 shows superb optical performance as a result of good corrections to various aberrations in each focal length state from the wide-angle end state to the telephoto end state.

By the way, in Example 2, the effective diameter Φ1 of the cemented positive lens L11 which is the most object side lens of the first lens group G1 is less than 22.2 mm, so that the zoom lens system is a very compact design. The moving amount of the first lens group upon zooming from the wide-angle end state W to the telephoto end state T is about ¼ of the total lens length of the zoom lens system in the telephoto end state T, so that the lens barrel can be effectively retracted upon retracting. The half angle of view in the telephoto end state T is about 3.3 degrees.

Example 3

Figure 7:
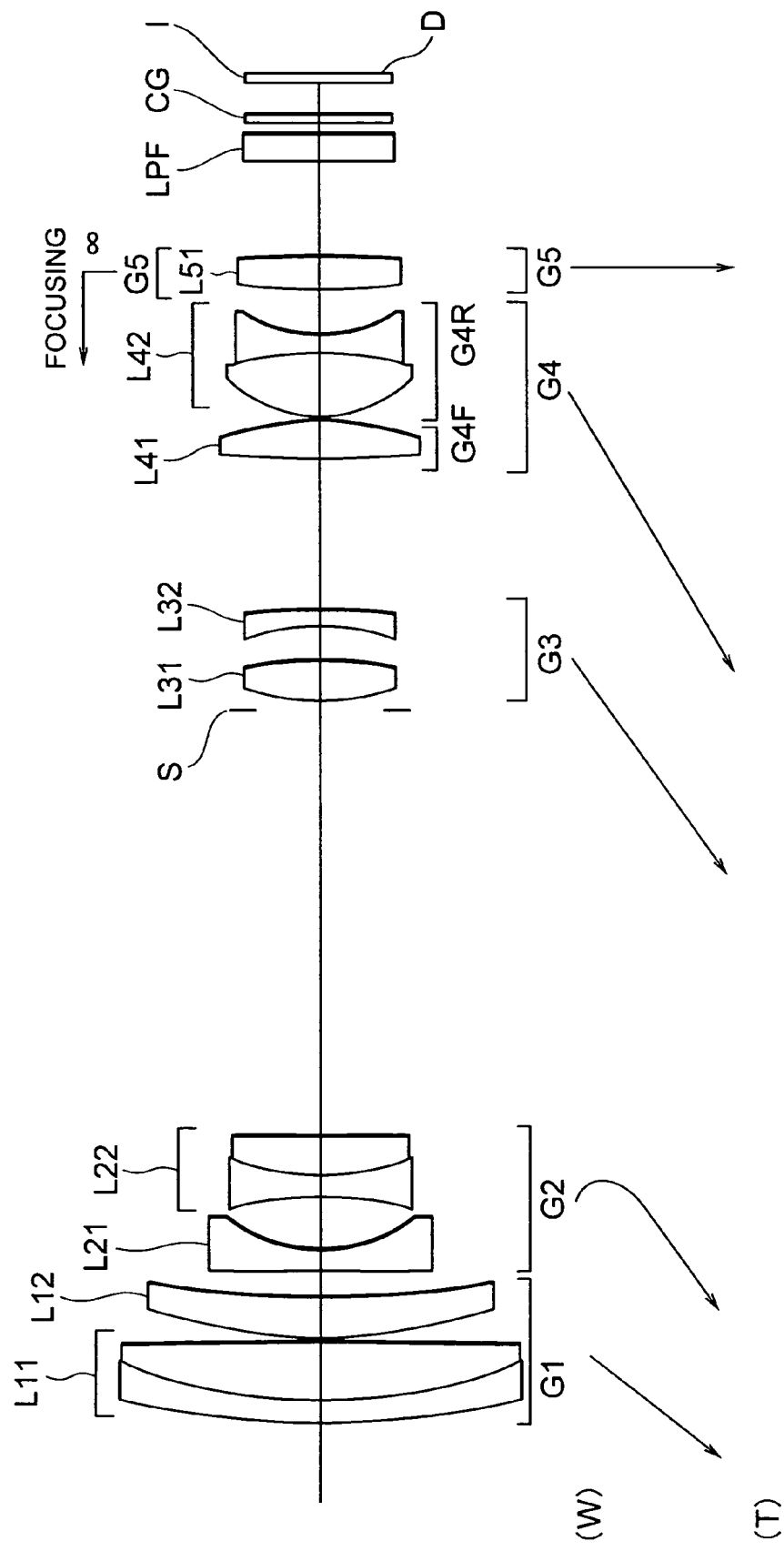
FIG. 7 is a diagram showing a sectional view of a large-aperture-ratio internal focusing telephoto lens according to Example 3 of the present invention.

FIG. 7 is a diagram showing the lens arrangement of a zoom lens system according to Example 3 of the present invention in a wide-angle end state W focusing on infinity.

In FIG. 7, the zoom lens system according to Example 3 is composed of, in order from an object, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, an optical low-pass filter LPF, and a cover glass CG of a solid-state imaging device D disposed in the image plane I.

The first lens group G1 is composed of, in order from the object, a cemented positive lens L11 constructed by a negative meniscus lens having a convex surface facing to the object cemented with a double convex positive lens, and a positive meniscus lens L12 having a convex surface facing to the object.

The second lens group G2 is composed of, in order from the object, a double concave negative lens L21, and a cemented negative lens L22 constructed by a double concave negative lens cemented with a double convex positive lens.

The third lens group G3 is composed of, in order from the object, a double convex positive lens L31 and a negative meniscus lens L32 having a concave surface facing to the object.

The fourth lens group G4 is composed of, in order from the object, a front lens group G4F and a rear lens group G4R.

The front lens group G4F is composed of a double convex positive lens L41 having an aspherical surface facing to the image.

The rear lens group G4R is composed of a cemented negative lens L42 constructed by, in order from the object, a double convex positive lens cemented with a double concave negative lens.

The fifth lens group G5 is composed of a double convex positive lens L51.

Various values associated with Example 3 are listed in Table 3.

TABLE 3

[Specifications]

|  | W | T |
|---|---|---|
| f = | 6.36 | 60.00 |
| FNO = | 2.8 | 5.2 |

[Lens Data]

| | r | d | ν | n | |
|---|---|---|---|---|---|
| 1) | 47.2981 | 1.2000 | 23.78 | 1.846660 | Φ1 = 22.0 |
| 2) | 27.8770 | 3.4000 | 55.53 | 1.696797 | |
| 3) | −609.3584 | 0.1000 | | | |
| 4) | 28.6190 | 2.3000 | 82.56 | 1.497820 | |
| 5) | 54.3710 | (d5) | | | |
| 6) | −131.5016 | 1.2000 | 40.76 | 1.882997 | |
| 7) | 8.5445 | 2.8000 | | | |
| 8*) | −15.3114 | 1.1000 | 64.10 | 1.516800 | |
| 9) | 11.6111 | 2.3000 | 22.76 | 1.808095 | |
| 10) | −294.9826 | (d10) | | | |
| 11> | 0.0000 | 0.5000 | Aperture Stop S | | |
| 12) | 13.7503 | 2.3000 | 64.10 | 1.516800 | |
| 13) | −21.4402 | 1.9000 | | | |
| 14) | −11.5906 | 1.1000 | 23.78 | 1.846660 | |
| 15) | −27.8389 | (d15) | | | |
| 16) | 103.9090 | 2.2000 | 40.87 | 1.804320 | |
| 17*) | −15.3357 | 0.1000 | | | |
| 18) | 7.3456 | 3.6000 | 82.56 | 1.497820 | |
| 19) | −16.7571 | 1.1000 | 40.76 | 1.882997 | |
| 20) | 8.0735 | (d20) | | | |
| 21) | 34.7963 | 1.9000 | 48.84 | 1.531717 | |
| 22) | −56.1513 | (d22) | | | |
| 23) | 0.0000 | 1.6000 | 70.51 | 1.544370 | |
| 24) | 0.0000 | 0.5000 | | | |
| 25) | 0.0000 | 0.5000 | 64.10 | 1.516800 | |
| 26) | 0.0000 | Bf | | | |

TABLE 3-continued

[Aspherical Data]

Surface Number 8

κ = −1.4873
C2 = 0.00000E+00
C4 = 0.00000E+00
C6 = −4.71380E−07
C8 = 2.03480E−08

Surface Number 17

κ = 0.0748
C2 = 0.00000E+00
C4 = 0.00000E+00
C6 = 1.39380E−08
C8 = −1.03260E−08

[Variable Distances]

| | W | M | T |
|---|---|---|---|
| <upon focusing on infinity> | | | |
| f | 6.36000 | 28.00000 | 60.00000 |
| D0 | ∞ | ∞ | ∞ |
| d5 | 1.53220 | 15.54518 | 22.13202 |
| d10 | 23.54899 | 7.89879 | 2.92110 |
| d15 | 8.21038 | 4.01207 | 3.22481 |
| d20 | 2.38936 | 16.12178 | 22.94060 |
| d22 | 5.20000 | 5.20000 | 5.20000 |
| Bf | 1.71609 | 1.71609 | 1.71609 |
| TL | 74.29702 | 82.19392 | 89.83460 |
| <upon focusing on a close object> | | | |
| β | −0.02604 | −0.09711 | −0.05539 |
| D0 | 225.7030 | 217.8060 | 910.1655 |
| d5 | 1.53220 | 15.54518 | 22.13202 |
| d10 | 23.54899 | 7.89879 | 2.92110 |
| d15 | 8.21038 | 4.01207 | 3.22481 |
| d20 | 1.99671 | 10.83033 | 16.69159 |
| d22 | 5.59265 | 10.49145 | 11.44900 |
| Bf | 1.71609 | 1.71609 | 1.71609 |
| TL | 74.29702 | 82.19392 | 89.83460 |

[Values for Conditional Expressions]

(1): (f4F + f4R)/f4 = −0.360
(2): (fW × f1)/(ft × f3) = 0.120
(3): (fW × f4)/(fT × f3) = 0.061
(4): (fW × f4)/(fT × f5) = 0.060
(5): f4F/f5 = 0.412

Figure 8A:
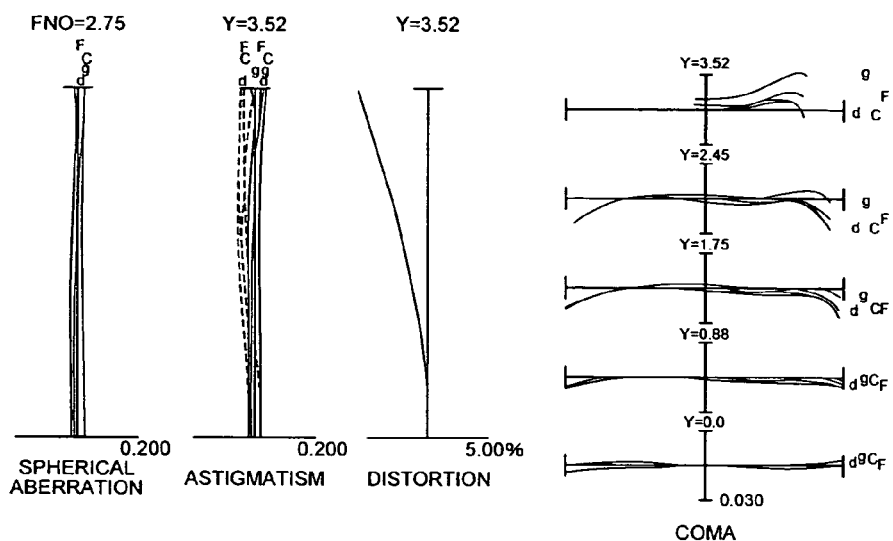
FIG. 8A is graphs showing various aberrations of the zoom lens system according to Example 3 of the present invention focusing on infinity in the wide-angle end state.
Figure 8B:
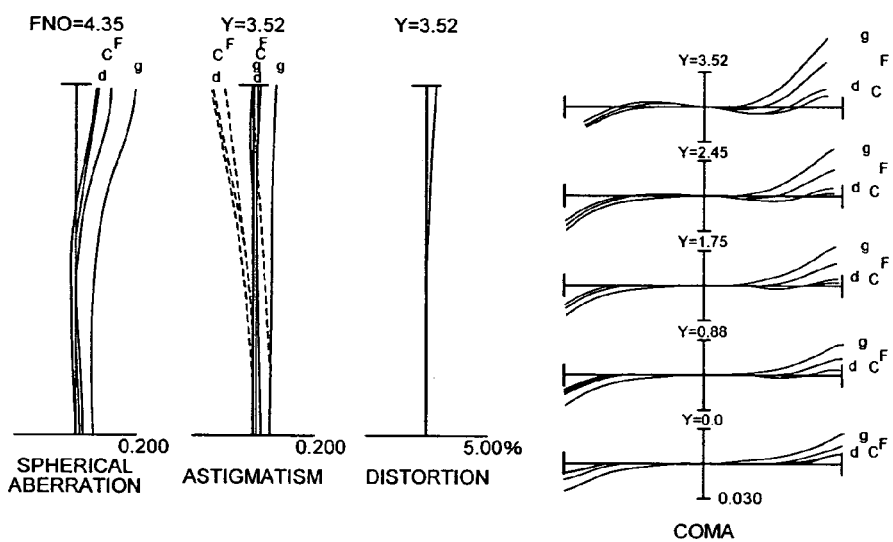
FIG. 8B is graphs showing various aberrations of the zoom lens system according to Example 3 of the present invention focusing on infinity in the intermediate focal length state.
Figure 8C:
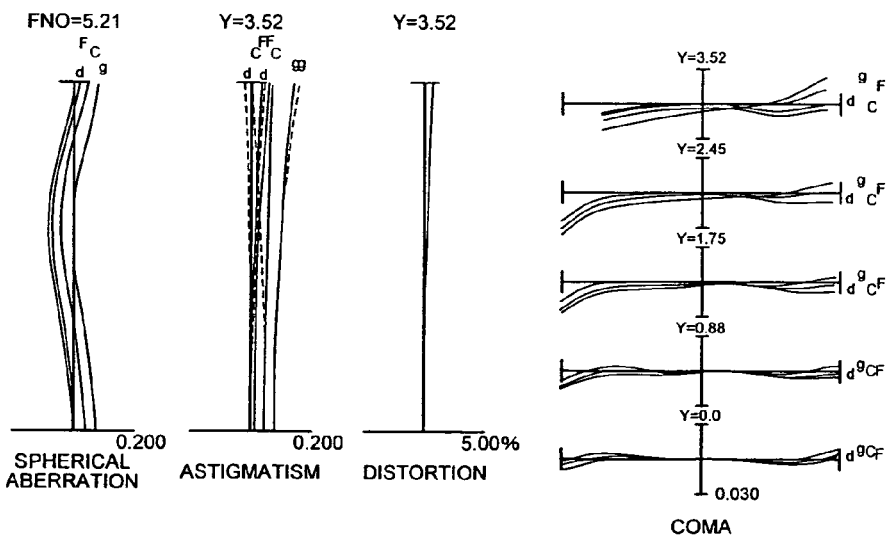
FIG. 8C is graphs showing various aberrations of the zoom lens system according to Example 3 of the present invention focusing on infinity in the telephoto end state.

FIGS. 8A, 8B, and 8C are graphs showing various aberrations of the zoom lens system according to Example 3 of the present invention focusing on infinity in which FIG. 8A shows various aberrations in the wide-angle end state, FIG. 8B shows various aberrations in the intermediate focal length state, and FIG. 8C shows various aberrations in the telephoto end state. FIGS. 9A, 9B, and 9C are graphs showing various aberrations of the zoom lens system according to Example 3 of the present invention focusing on the closest object in which FIG. 9A shows various aberrations in the wide-angle end state, FIG. 9B shows various aberrations in the intermediate focal length state, and FIG. 9C shows various aberrations in the telephoto end state.

As is apparent from the respective graphs, the zoom lens system according to Example 3 shows superb optical performance as a result of good corrections to various aberrations in each focal length state from the wide-angle end state to the telephoto end state.

By the way, in Example 3, the effective diameter Φ1 of the cemented positive lens L11 which is the most object side lens of the first lens group G1 is less than 22.0 mm, so that the zoom lens system is a very compact design. The moving amount of the first lens group upon zooming from the wide-angle end state W to the telephoto end state T is about ⅙ of the total lens length of the zoom lens system in the telephoto end state T, so that the lens barrel can be effectively retracted upon retracting. The half angle of view in the telephoto end state T is about 3.3 degrees.

Example 4

Figure 10:
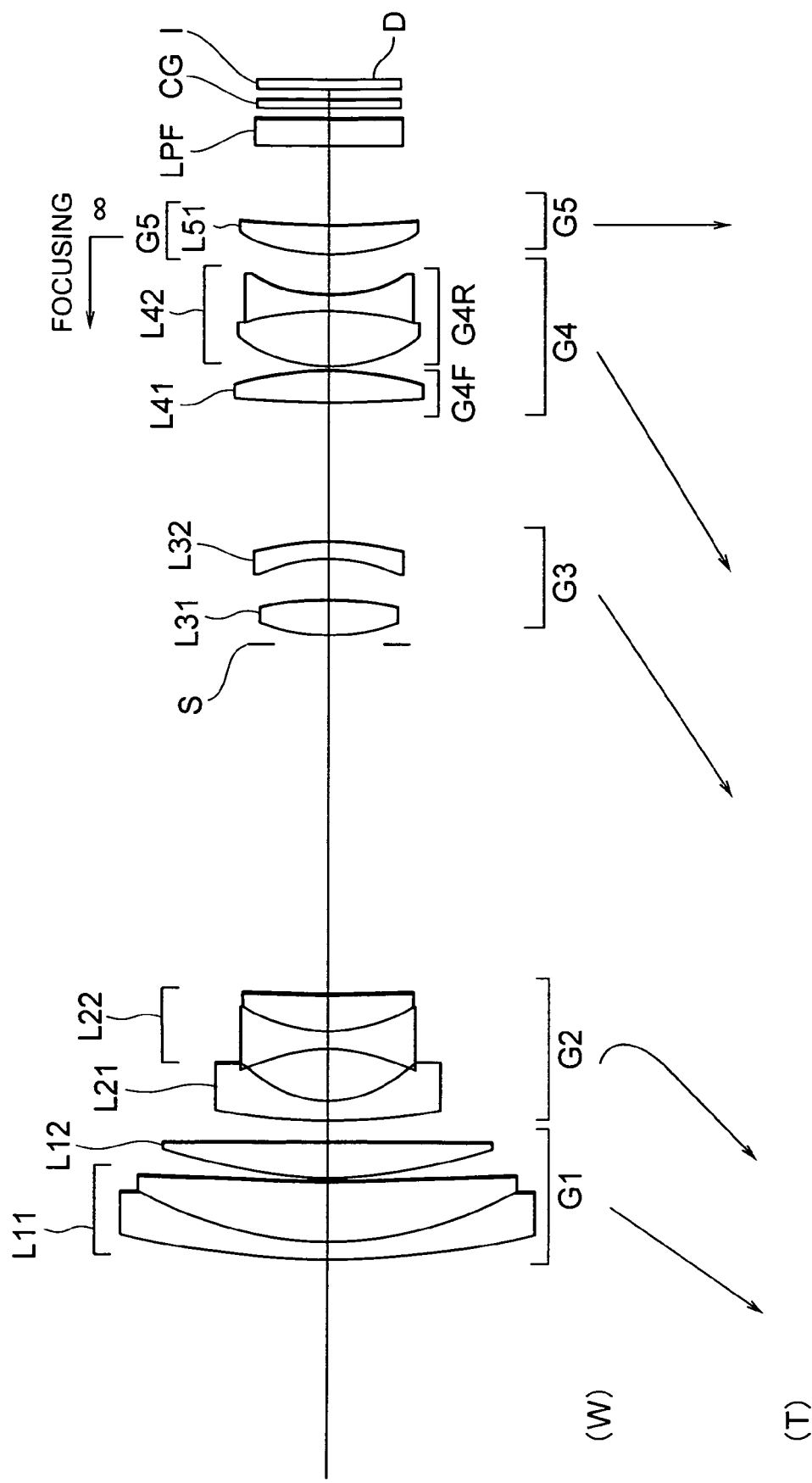
FIG. 10 is a diagram showing a sectional view of a large-aperture-ratio internal focusing telephoto lens according to Example 4 of the present invention.

FIG. 10 is a diagram showing the lens arrangement of a zoom lens system according to Example 4 of the present invention in a wide-angle end state W focusing on infinity.

In FIG. 10, the zoom lens system according to Example 4 is composed of, in order from an object, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, an optical low-pass filter LPF, and a cover glass CG of a solid-state imaging device D disposed in the image plane I.

The first lens group G1 is composed of, in order from the object, a cemented positive lens L11 constructed by a negative meniscus lens having a convex surface facing to the object cemented with a positive meniscus lens having a convex surface facing to the object, and a positive meniscus lens L12 having a convex surface facing to the object.

The second lens group G2 is composed of, in order from the object, a negative meniscus lens L21 having a convex surface facing to the object, and a cemented negative lens L22 constructed by a double concave negative lens cemented with a positive meniscus lens having a convex surface facing to the object.

The third lens group G3 is composed of, in order from the object, a double convex positive lens L31 and a negative meniscus lens L32 having a concave surface facing to the object.

The fourth lens group G4 is composed of, in order from the object, a front lens group G4F and a rear lens group G4R.

The front lens group G4F is composed of a double convex positive lens L41 having an aspherical surface facing to the image.

The rear lens group G4R is composed of a cemented negative lens L42 constructed by, in order from the object, a double convex positive lens cemented with a double concave negative lens.

The fifth lens group G5 is composed of a positive meniscus lens L51 having a convex surface facing to the object.

Various values associated with Example 4 are listed in Table 4.

TABLE 4

[Specifications]

|  | W | T |
|---|---|---|
| f = | 5.57 | 52.50 |
| FNO = | 2.7 | 6.0 |

[Lens Data]

| | r | d | ν | n | |
|---|---|---|---|---|---|
| 1) | 50.9297 | 1.0000 | 33.89 | 1.803840 | Φ1 = 22.8 |
| 2) | 21.7394 | 3.5000 | 55.53 | 1.696797 | |
| 3) | 159.7280 | 0.1000 | | | |
| 4) | 28.2085 | 2.0000 | 82.56 | 1.497820 | |
| 5) | 515.6394 | (d5) | | | |

TABLE 4-continued

| | r | d | ν | n |
|---|---|---|---|---|
| 6) | 43.8393 | 1.1000 | 40.76 | 1.882997 |
| 7) | 7.2537 | 2.9000 | | |
| 8*) | −11.6415 | 1.0000 | 64.10 | 1.516800 |
| 9) | 9.2610 | 2.1000 | 22.76 | 1.808095 |
| 10) | 85.9378 | (d10) | | |
| 11> | 0.0000 | 0.5000 | Aperture Stop S | |
| 12) | 12.3859 | 2.0000 | 82.52 | 1.497820 |
| 13) | −16.9370 | 2.3000 | | |
| 14) | −9.2792 | 1.0000 | 23.78 | 1.846660 |
| 15) | −16.6220 | (d15) | | |
| 16) | 64.7278 | 1.9000 | 40.87 | 1.804320 |
| 17*) | −15.9612 | 0.1000 | | |
| 18) | 8.1828 | 3.2000 | 82.56 | 1.497820 |
| 19) | −17.6201 | 1.0000 | 40.76 | 1.882997 |
| 20) | 8.7793 | (d20) | | |
| 21) | 11.1172 | 1.7000 | 48.84 | 1.531717 |
| 22) | 42.3486 | (d22) | | |
| 23) | 0.0000 | 1.5000 | 70.51 | 1.544370 |
| 24) | 0.0000 | 0.5000 | | |
| 25) | 0.0000 | 0.5000 | 64.10 | 1.516800 |
| 26) | 0.0000 | Bf | | |

[Aspherical Data]

Surface Number 8

$\kappa = 1.2175$
$C2 = 0.00000E+00$
$C4 = 0.00000E+00$
$C6 = -2.76600E-06$
$C8 = -2.93520E-09$ Surface Number 17

$\kappa = -0.3265$
$C2 = 0.00000E+00$
$C4 = 0.00000E+00$
$C6 = -1.33490E-07$
$C8 = -3.04060E-10$

[Variable Distances]

| | W | M | T |
|---|---|---|---|
| <upon focusing on infinity> | | | |
| f | 6.36000 | 28.00000 | 60.00000 |
| D0 | ∞ | ∞ | ∞ |
| d5 | 1.22740 | 14.89085 | 19.39413 |
| d10 | 19.85241 | 5.59456 | 2.60096 |
| d15 | 7.98445 | 3.21186 | 2.30792 |
| d20 | 2.20650 | 19.91373 | 29.81295 |
| d22 | 4.55000 | 4.55000 | 4.55000 |
| Bf | 0.53109 | 0.53109 | 0.53109 |
| TL | 66.25185 | 78.59208 | 89.09705 |
| <upon focusing on a close object> | | | |
| β | −0.02220 | −0.09425 | −0.04780 |
| D0 | 233.7482 | 221.4079 | 910.9030 |
| d5 | 1.22740 | 14.89085 | 19.39413 |
| d10 | 19.85241 | 5.59456 | 2.60096 |
| d15 | 7.98445 | 3.21186 | 2.30792 |
| d20 | 1.96739 | 15.64321 | 25.72212 |
| d22 | 4.78911 | 8.82052 | 8.64083 |
| Bf | 0.53109 | 0.53109 | 0.53109 |
| TL | 66.25185 | 78.59208 | 89.09705 |

[Values for Conditional Expressions]

(1): (f4F + f4R)/f4 = −0.272
(2): (fW × f1)/(ft × f3) = 0.168
(3): (fW × f4)/(fT × f3) = 0.098
(4): (fW × f4)/(fT × f5) = 0.097
(5): f4F/f5 = 0.578

Figure 11A:
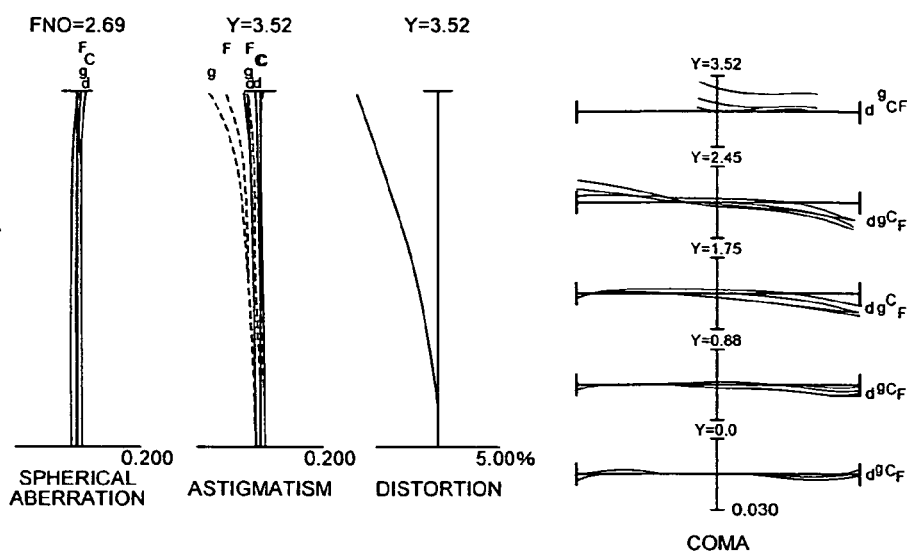
FIG. 11A is graphs showing various aberrations of the zoom lens system according to Example 4 of the present invention focusing on infinity in the wide-angle end state.
Figure 11B:
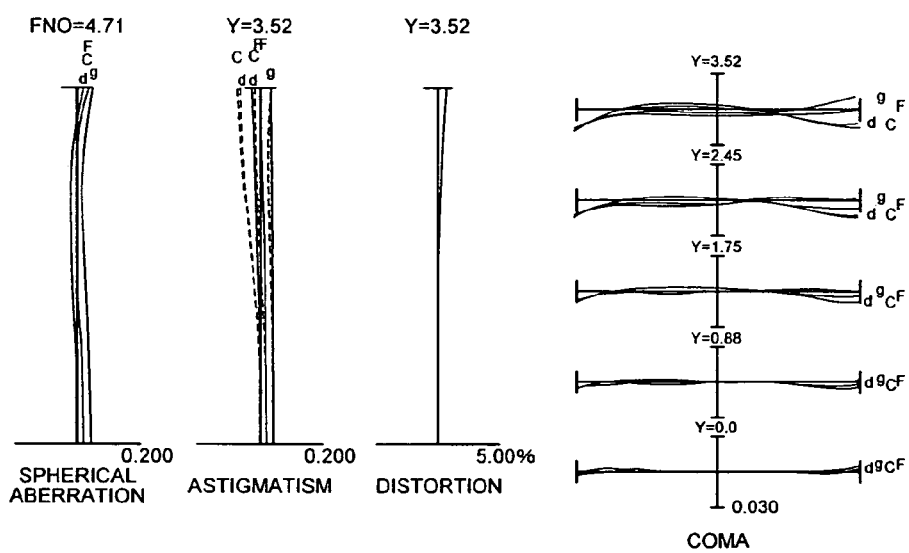
FIG. 11B is graphs showing various aberrations of the zoom lens system according to Example 4 of the present invention focusing on infinity in the intermediate focal length state.
Figure 11C:
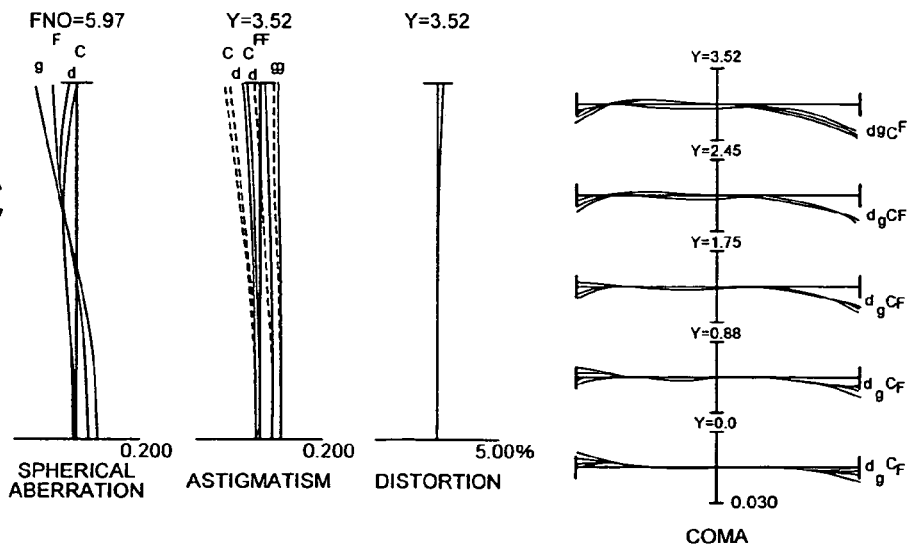
FIG. 11C is graphs showing various aberrations of the zoom lens system according to Example 4 of the present invention focusing on infinity in the telephoto end state.
Figure 12A:
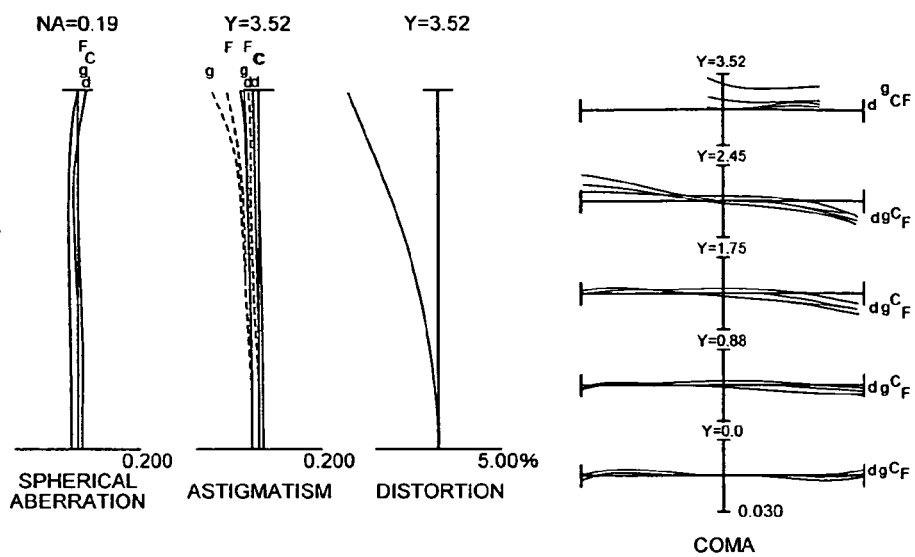
FIG. 12A is graphs showing various aberrations of the zoom lens system according to Example 4 of the present invention focusing on the closest object in the wide-angle end state.
Figure 12B:
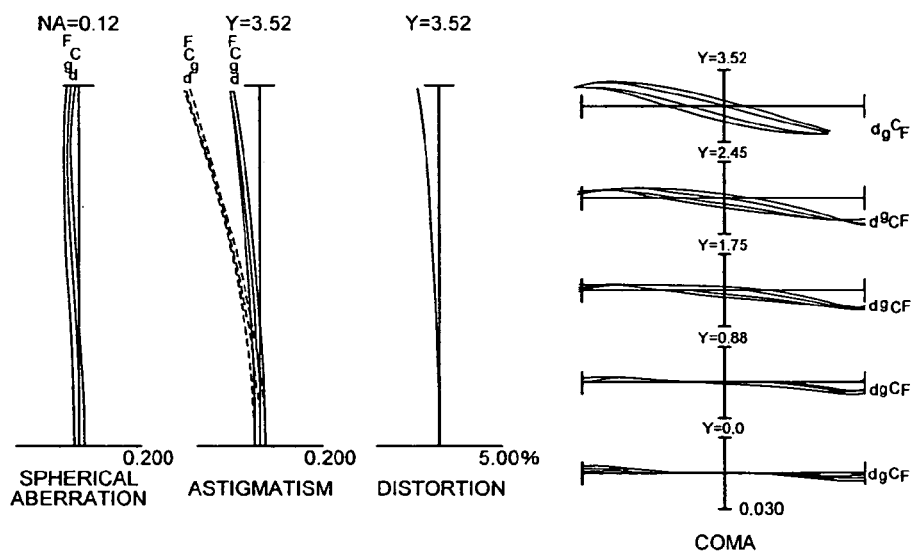
FIG. 12B is graphs showing various aberrations of the zoom lens system according to Example 4 of the present invention focusing on the closest object in the intermediate focal length state.
Figure 12C:
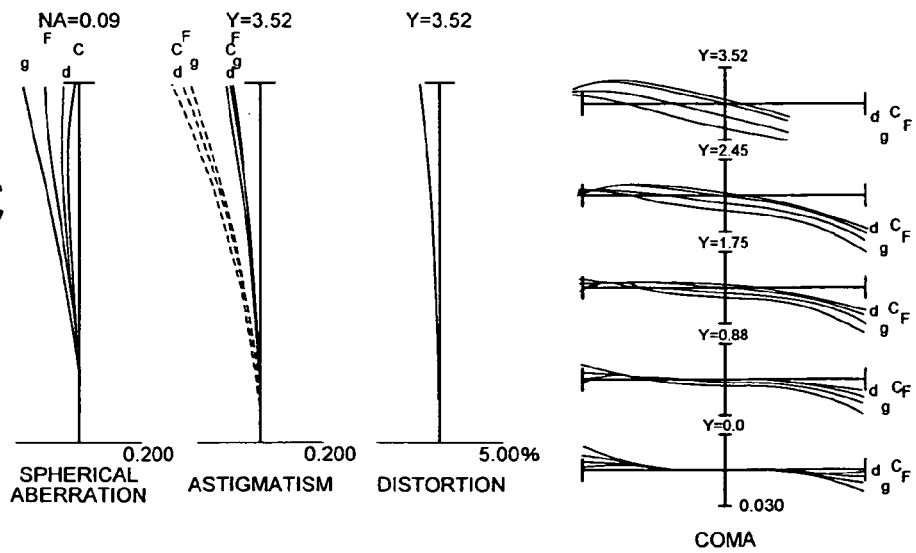
FIG. 12C is graphs showing various aberrations of the zoom lens system according to Example 4 of the present invention focusing on the closest object in the telephoto end state.

FIGS. 11A, 11B, and 11C are graphs showing various aberrations of the zoom lens system according to Example 4 of the present invention focusing on infinity in which FIG. 11A shows various aberrations in the wide-angle end state, FIG. 11B shows various aberrations in the intermediate focal length state, and FIG. 11C shows various aberrations in the telephoto end state. FIGS. 12A, 12B, and 12C are graphs showing various aberrations of the zoom lens system according to Example 4 of the present invention focusing on the closest object in which FIG. 12A shows various aberrations in the wide-angle end state, FIG. 12B shows various aberrations in the intermediate focal length state, and FIG. 12C shows various aberrations in the telephoto end state.

As is apparent from the respective graphs, the zoom lens system according to Example 4 shows superb optical performance as a result of good corrections to various aberrations in each focal length state from the wide-angle end state to the telephoto end state.

By the way, in Example 4, the effective diameter Φ1 of the cemented positive lens L11 which is the most object side lens of the first lens group G1 is less than 22.8 mm, so that the zoom lens system is a very compact design. The moving amount of the first lens group upon zooming from the wide-angle end state W to the telephoto end state T is about ¼ of the total lens length of the zoom lens system in the telephoto end state T, so that the lens barrel can be effectively retracted upon retracting. The half angle of view in the telephoto end state T is about 3.8 degrees.

Example 5

Figure 13:
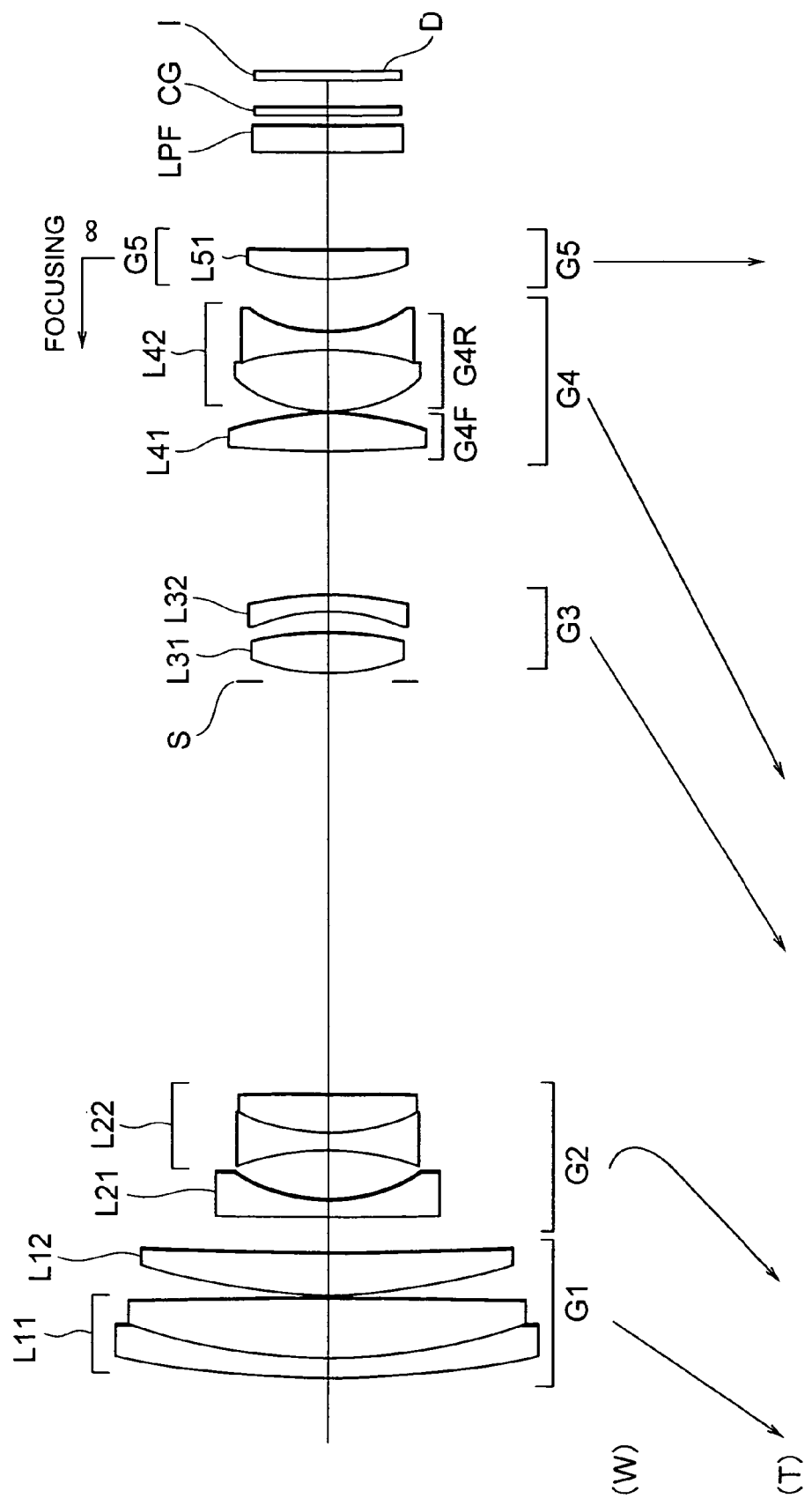
FIG. 13 is a diagram showing a sectional view of a large-aperture-ratio internal focusing telephoto lens according to Example 5 of the present invention.

FIG. 13 is a diagram showing the lens arrangement of a zoom lens system according to Example 5 of the present invention in a wide-angle end state W focusing on infinity.

In FIG. 13, the zoom lens system according to Example 5 is composed of, in order from an object, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, an optical low-pass filter LPF, and a cover glass CG of a solid-state imaging device D disposed in the image plane I.

The first lens group G1 is composed of, in order from the object, a cemented positive lens L11 constructed by a negative meniscus lens having a convex surface facing to the object cemented with a double convex positive lens, and a positive meniscus lens L12 having a convex surface facing to the object.

The second lens group G2 is composed of, in order from the object, a negative meniscus lens L21 having a convex surface facing to the object, and a cemented negative lens L22 constructed by a double concave negative lens cemented with a double convex positive lens.

The third lens group G3 is composed of, in order from the object, a double convex positive lens L31 and a negative meniscus lens L32 having a concave surface facing to the object.

The fourth lens group G4 is composed of, in order from the object, a front lens group G4F and a rear lens group G4R.

The front lens group G4F is composed of a double convex positive lens L41 having an aspherical surface facing to the image.

The rear lens group G4R is composed of a cemented negative lens L42 constructed by, in order from the object, a double convex positive lens cemented with a double concave negative lens.

The fifth lens group G5 is composed of a positive meniscus lens L51 having a convex surface facing to the object.

Various values associated with Example 5 are listed in Table 5.

TABLE 5

[Specifications]

| | W | T |
|---|---|---|
| f = | 6.75 | 77.60 |
| FNO = | 2.6 | 5.4 |

[Lens Data]

| | r | d | ν | n | |
|---|---|---|---|---|---|
| 1) | 58.0075 | 1.2000 | 25.41 | 1.805182 | Φ1 = 24.0 |
| 2) | 34.1633 | 3.5000 | 65.42 | 1.603001 | |
| 3) | −428.1467 | 0.1000 | | | |
| 4) | 33.8540 | 2.5000 | 82.56 | 1.497820 | |
| 5) | 142.0901 | (d5) | | | |
| 6) | 495.8320 | 1.0000 | 40.76 | 1.882997 | |
| 7) | 10.0959 | 2.8000 | | | |
| 8) | −14.8370 | 1.0000 | 61.14 | 1.589130 | |
| 9) | 12.2952 | 2.3000 | 22.76 | 1.808095 | |
| 10) | −249.3612 | (d10) | | | |
| 11> | 0.0000 | 0.5000 | Aperture Stop S | | |
| 12) | 13.7682 | 2.3000 | 82.56 | 1.497820 | |
| 13) | −30.3672 | 1.3184 | | | |
| 14) | −12.2059 | 1.0000 | 23.78 | 1.846660 | |
| 15) | −20.6505 | (d15) | | | |
| 16) | 124.0192 | 2.2000 | 40.87 | 1.804320 | |
| 17*) | −16.4504 | 0.1000 | | | |
| 18) | 8.1826 | 3.6000 | 82.56 | 1.497820 | |
| 19) | −18.9275 | 1.1000 | 40.76 | 1.882997 | |
| 20) | 8.8897 | (d20) | | | |
| 21) | 16.0881 | 1.7000 | 82.52 | 1.497820 | |
| 22) | 126.9750 | (d22) | | | |
| 23) | 0.0000 | 1.6000 | 70.51 | 1.544370 | |
| 24) | 0.0000 | 0.5000 | | | |
| 25) | 0.0000 | 0.5000 | 64.10 | 1.516800 | |
| 26) | 0.0000 | Bf | | | |

[Aspherical Data]

Surface Number 17

κ = −0.2398
C2 = 0.00000E+00
C4 = 0.00000E+00
C6 = −1.22770E−07
C8 = −9.86800E−10

[Variable Distances]

| | W | M | T |
|---|---|---|---|
| <upon focusing on infinity> | | | |
| f | 6.78000 | 28.00000 | 77.60000 |
| D0 | ∞ | ∞ | ∞ |
| d5 | 2.07380 | 16.32382 | 25.17225 |
| d10 | 23.72235 | 8.13082 | 1.27118 |
| d15 | 8.38910 | 3.70034 | 2.18059 |
| d20 | 2.95227 | 17.69181 | 29.46637 |
| d22 | 5.55855 | 5.55855 | 5.55855 |
| Bf | 1.47953 | 1.47953 | 1.47954 |
| TL | 74.99404 | 83.70331 | 95.94692 |
| <upon focusing on a close object> | | | |
| β | −0.02753 | −0.09776 | −0.06866 |
| D0 | 225.0060 | 216.2967 | 904.0540 |
| d5 | 2.07380 | 16.32382 | 25.17225 |
| d10 | 23.72235 | 8.13082 | 1.27118 |
| d15 | 8.38910 | 3.70034 | 2.18059 |
| d20 | 2.56880 | 12.90042 | 21.14839 |
| d22 | 5.94202 | 10.34994 | 13.87653 |
| Bf | 1.47953 | 1.47953 | 1.47954 |
| TL | 74.99404 | 83.70331 | 95.94692 |

[Values for Conditional Expressions]

(1): (f4F + f4R)/f4 = −0.272
(2): (fW × f1)/(ft × f3) = 0.115

TABLE 5-continued (3): (fW × f4)/(fT × f3) = 0.066
(4): (fW × f4)/(fT × f5) = 0.066
(5): f4F/f5 = 0.494

Figure 14A:
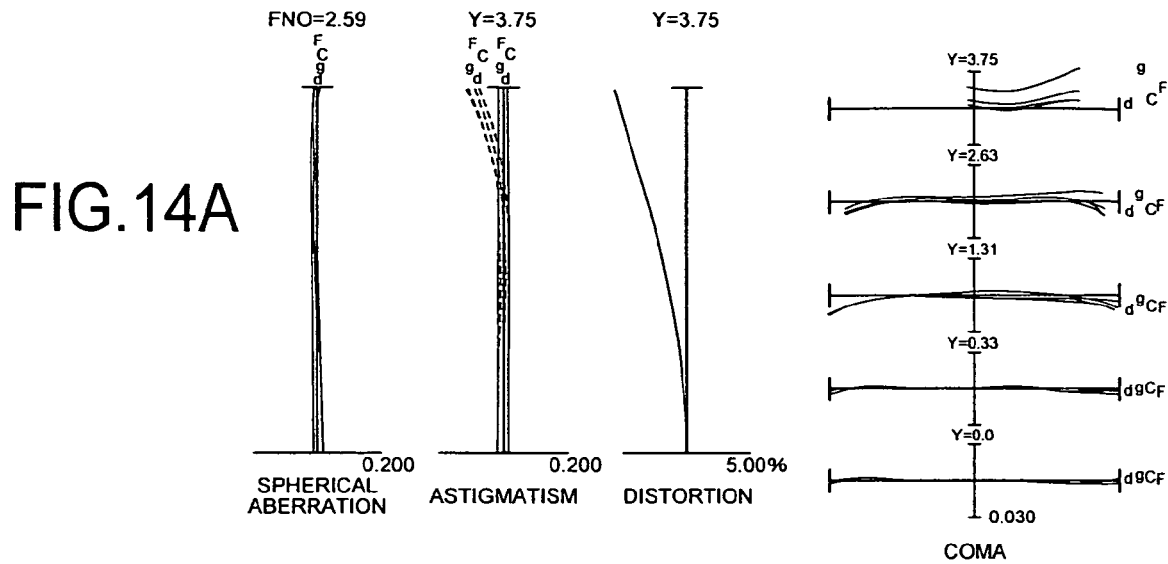
FIG. 14A is graphs showing various aberrations of the zoom lens system according to Example 5 of the present invention focusing on infinity in the wide-angle end state.
Figure 14B:
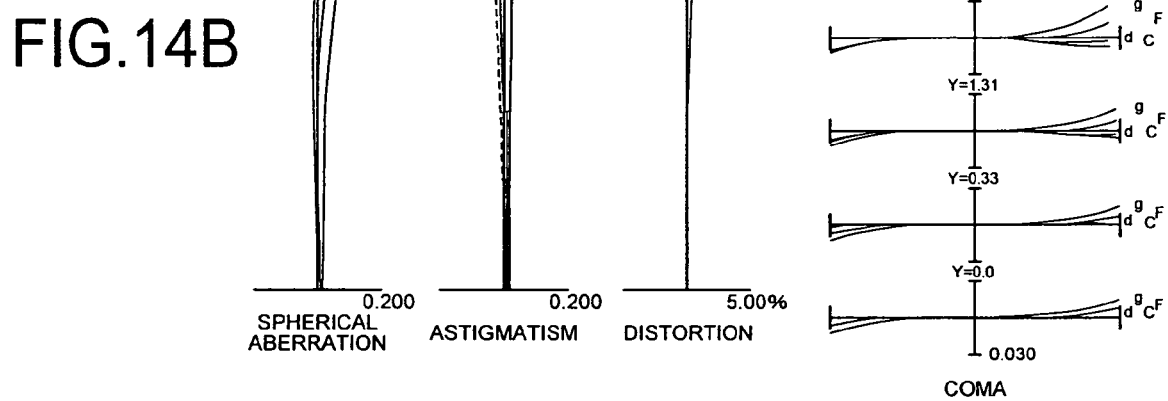
FIG. 14B is graphs showing various aberrations of the zoom lens system according to Example 5 of the present invention focusing on infinity in the intermediate focal length state.
Figure 14C:
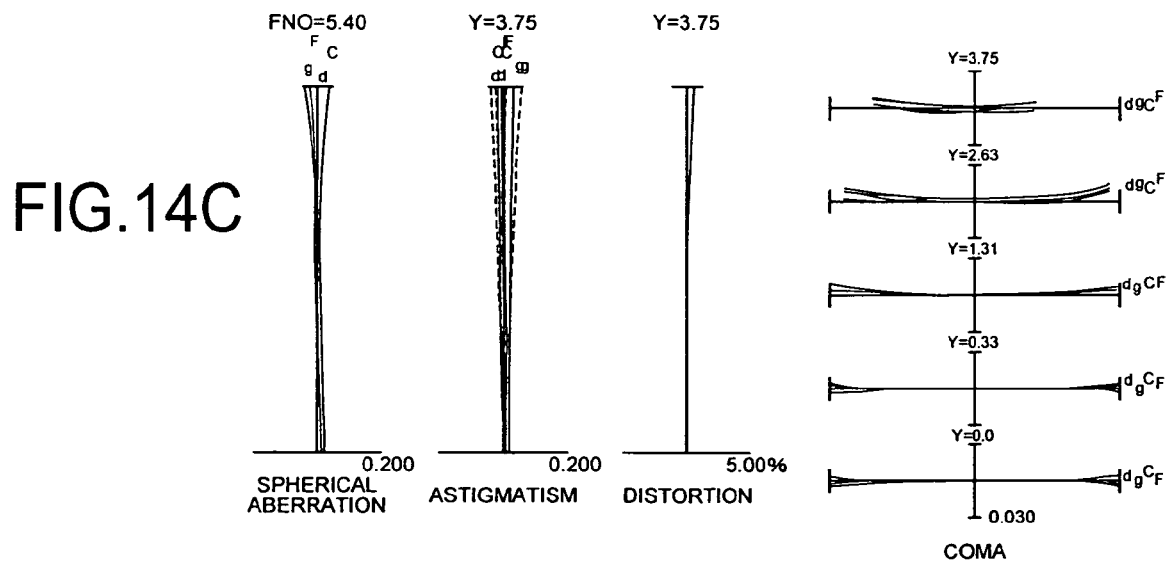
FIG. 14C is graphs showing various aberrations of the zoom lens system according to Example 5 of the present invention focusing on infinity in the telephoto end state.
Figure 15A:
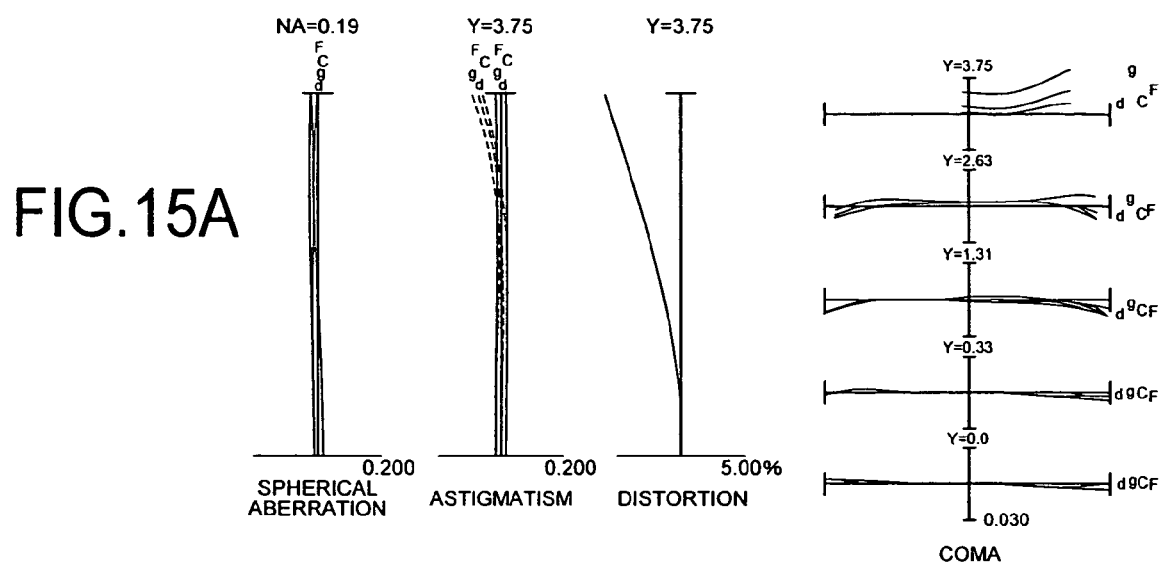
FIG. 15A is graphs showing various aberrations of the zoom lens system according to Example 5 of the present invention focusing on the closest object in the wide-angle end state.
Figure 15B:
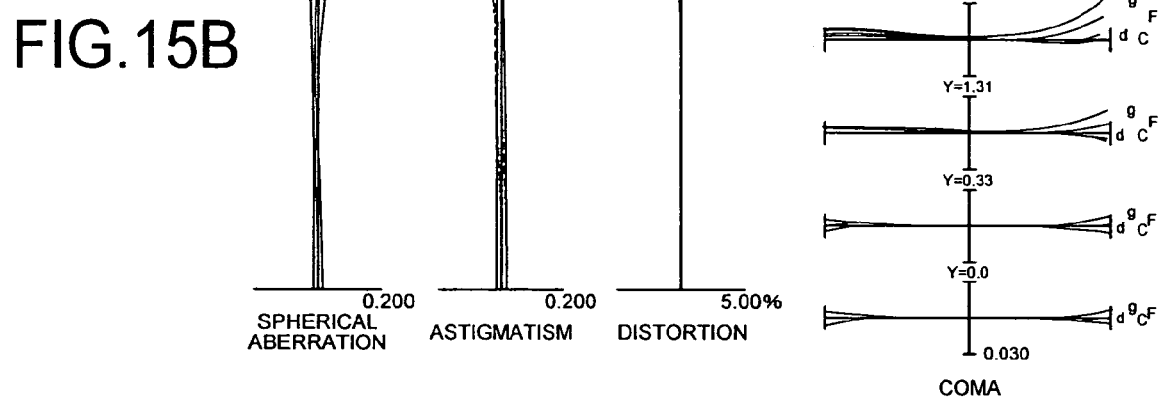
FIG. 15B is graphs showing various aberrations of the zoom lens system according to Example 5 of the present invention focusing on the closest object in the intermediate focal length state.
Figure 15C:
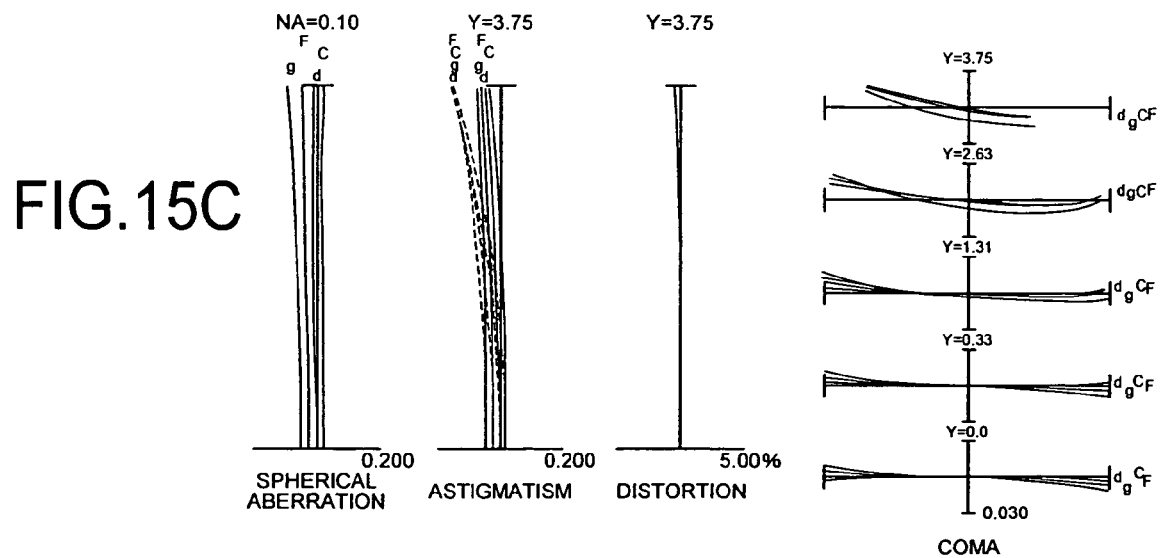
FIG. 15C is graphs showing various aberrations of the zoom lens system according to Example 5 of the present invention focusing on the closest object in the telephoto end state.

FIGS. 14A, 14B, and 14C are graphs showing various aberrations of the zoom lens system according to Example 5 of the present invention focusing on infinity in which FIG. 14A shows various aberrations in the wide-angle end state, FIG. 14B shows various aberrations in the intermediate focal length state, and FIG. 14C shows various aberrations in the telephoto end state. FIGS. 15A, 15B, and 15C are graphs showing various aberrations of the zoom lens system according to Example 5 of the present invention focusing on the closest object in which FIG. 15A shows various aberrations in the wide-angle end state, FIG. 15B shows various aberrations in the intermediate focal length state, and FIG. 15C shows various aberrations in the telephoto end state.

As is apparent from the respective graphs, the zoom lens system according to Example 5 shows superb optical performance as a result of good corrections to various aberrations in each focal length state from the wide-angle end state to the telephoto end state.

By the way, in Example 5, the effective diameter Φ1 of the cemented positive lens L11 which is the most object side lens of the first lens group G1 is less than 24.0 mm, so that the zoom lens system is a very compact design. The moving amount of the first lens group upon zooming from the wide-angle end state W to the telephoto end state T is about 1/4.5 of the total lens length of the zoom lens system in the telephoto end state T, so that the lens barrel can be effectively retracted upon retracting. The half angle of view in the telephoto end state T is about 2.8 degrees.

As described above, in the zoom lens system according to each Example, an image blur caused by a camera shake may be corrected by moving any lens or any lens group perpendicularly to the optical axis. Moreover, in order to correct chromatic aberration upon shooting a close object, the fifth lens group may be constructed by a so-called achromatic composition which is composed of a positive lens and a negative lens.

Incidentally, it is needless to say that although zoom lens systems with a five-lens-group configuration are shown as respective examples of the present invention, a zoom lens system simply added by a lens group to the five-lens-group configuration is included in the spirit or scope of the present invention. Moreover, in the configuration of each lens group, a lens group simply added by lens elements to the lens group shown in examples is included in the spirit or scope of the present invention.

Additional advantages and modification will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
a first lens group having positive refractive power;
a second lens group having negative refractive power;
a third lens group having positive refractive power;
a fourth lens group having positive refractive power; and
a fifth lens group having positive refractive power;
wherein when a state of lens group positions varies from a wide-angle end state to a telephoto end state, the first, second, third, and fourth lens groups move along an optical axis and the second lens group moves along a zoom trajectory having a concave shape facing to the object,
the fourth lens group being composed of, in order from the object, a front lens group having positive refractive power, and a rear lens group having negative refractive power with an air space in between, and
the following conditional expression being satisfied:

$$-0.45 < (f4F + f4R)/f4 < -0.20$$

where f4 denotes the focal length of the fourth lens group, f4F denotes the focal length of the front lens group, and f4R denotes the focal length of the rear lens group.

2. The zoom lens system according to claim 1, wherein the following conditional expression is satisfied:

$$0.090 < (fW \times f1)/(fT \times f3) < 0.170$$

where fT denotes the focal length of the zoom lens system in the telephoto end state, fW denotes the focal length of the zoom lens system in the wide-angle end state, f1 denotes the focal length of the first lens group, and f3 denotes the focal length of the third lens group.

3. The zoom lens system according to claim 2, wherein the following conditional expression is satisfied:

$$0.050 < (fW \times f4)/(fT \times f3) < 0.100$$

where fT denotes the focal length of the zoom lens system in the telephoto end state, fW denotes the focal length of the zoom lens system in the wide-angle end state, and f3 denotes the focal length of the third lens group.

4. The zoom lens system according to claim 3, wherein the following conditional expression is satisfied:

$$0.050 < (fW \times f4)/(fT \times f5) < 0.100$$

where fT denotes the focal length of the zoom lens system in the telephoto end state, fW denotes the focal length of the zoom lens system in the wide-angle end state, and f5 denotes the focal length of the fifth lens group.

5. The zoom lens system according to claim 4, wherein the following conditional expression is satisfied:

$$0.40 < f4F/f5 < 0.60$$

where f5 denotes the focal length of the fifth lens group.

6. The zoom lens system according to claim 2, wherein the following conditional expression is satisfied:

$$0.050 < (fW \times f4)/(fT \times f5) < 0.100$$

where fT denotes the focal length of the zoom lens system in the telephoto end state, fW denotes the focal length of the zoom lens system in the wide-angle end state, and f5 denotes the focal length of the fifth lens group.

7. The zoom lens system according to claim 2, wherein the following conditional expression is satisfied:

$$0.40 < f4F/f5 < 0.60$$

where f5 denotes the focal length of the fifth lens group.

8. The zoom lens system according to claim 1, wherein the following conditional expression is satisfied:

$$0.050 < (fW \times f4)/(fT \times f3) < 0.100$$

where fT denotes the focal length of the zoom lens system in the telephoto end state, fW denotes the focal length of the zoom lens system in the wide-angle end state, and f3 denotes the focal length of the third lens group.

9. The zoom lens system according to claim 8, wherein the following conditional expression is satisfied:

$$0.050 < (fW \times f4)/(fT \times f5) < 0.100$$

where fT denotes the focal length of the zoom lens system in the telephoto end state, fW denotes the focal length of the zoom lens system in the wide-angle end state, and f5 denotes the focal length of the fifth lens group.

10. The zoom lens system according to claim 8, wherein the following conditional expression is satisfied:

$$0.40 < f4F/f5 < 0.60$$

where f5 denotes the focal length of the fifth lens group.

11. The zoom lens system according to claim 1, wherein the following conditional expression is satisfied:

$$0.050 < (fW \times f4)/(fT \times f5) < 0.100$$

where fT denotes the focal length of the zoom lens system in the telephoto end state, fW denotes the focal length of the zoom lens system in the wide-angle end state, and f5 denotes the focal length of the fifth lens group.

12. The zoom lens system according to claim 11, wherein the following conditional expression is satisfied:

$$0.40 < f4F/f5 < 0.60$$

where f5 denotes the focal length of the fifth lens group.

13. The zoom lens system according to claim 1, wherein the following conditional expression is satisfied:

$$0.40 < f4F/f5 < 0.60$$

where f5 denotes the focal length of the fifth lens group.

14. The zoom lens system according to claim 1, wherein at least one surface of the fourth lens group is an aspherical surface.

15. The zoom lens system according to claim 1, wherein the fifth lens group is fixed upon varying the state of lens group positions from the wide-angle end state to the telephoto end state and moved along the optical axis upon focusing.

16. The zoom lens system according to claim 1, further comprising a plane parallel plate and a solid-state imaging device.

17. A zoom lens system comprising, in order from an object:

a first lens group having positive refractive power;

a second lens group having negative refractive power;

a third lens group having positive refractive power;

a fourth lens group having positive refractive power; and a fifth lens group having positive refractive power;

wherein when a state of lens group positions varies from a wide-angle end state to a telephoto end state, the first, second, third, and fourth lens groups move along an optical axis, the fourth lens group being composed of, in order from the object, a front lens group having positive refractive power, and a rear lens group having negative refractive power with an air space in between, and the following conditional expression being satisfied:

$$-0.45 < (f4F + f4R)/f4 < -0.20$$

where f4 denotes the focal length of the fourth lens group, f4F denotes the focal length of the front lens group, and f4R denotes the focal length of the rear lens group.

* * * * *